(12) United States Patent
Bito et al.

(10) Patent No.: US 10,009,524 B2
(45) Date of Patent: Jun. 26, 2018

(54) ZOOM LENS SYSTEM, IMAGING DEVICE, AND CAMERA

(71) Applicant: Panasonic Intellectual Property Management Co., Ltd., Osaka (JP)

(72) Inventors: Takakazu Bito, Osaka (JP); Hiroaki Suzuki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 65 days.

(21) Appl. No.: 14/829,669

(22) Filed: Aug. 19, 2015

(65) Prior Publication Data

US 2016/0054550 A1    Feb. 25, 2016

(30) Foreign Application Priority Data

Aug. 20, 2014  (JP) ................................. 2014-167103
Jul. 30, 2015  (JP) ................................. 2015-150192

(51) Int. Cl.

| G02B 15/20 | (2006.01) |
|---|---|
| H04N 5/225 | (2006.01) |
| G02B 13/18 | (2006.01) |
| G02B 27/64 | (2006.01) |
| G02B 15/173 | (2006.01) |

(52) U.S. Cl.
CPC .......... *H04N 5/2254* (2013.01); *G02B 13/18* (2013.01); *G02B 15/173* (2013.01); *G02B 27/646* (2013.01)

(58) Field of Classification Search
CPC ...... G02B 15/00; G02B 15/14; G02B 15/155; G02B 15/16; G02B 15/163

USPC ................. 359/641, 676, 682, 685
See application file for complete search history.

(56) References Cited

U.S. PATENT DOCUMENTS

| 7,330,316 B2* | 2/2008 | Shibayama | .......... G02B 15/173 |
|---|---|---|---|
| | | | 359/557 |
| 8,331,034 B2* | 12/2012 | Kimura | ................ G02B 15/173 |
| | | | 359/676 |
| 2012/0262595 A1* | 10/2012 | Kishida | .................... G02B 7/08 |
| | | | 348/220.1 |
| 2014/0036137 A1* | 2/2014 | Inoue | .................... G02B 15/15 |
| | | | 348/345 |

FOREIGN PATENT DOCUMENTS

JP    10-333038    12/1998

* cited by examiner

*Primary Examiner* — Robert E Tallman
(74) *Attorney, Agent, or Firm* — Wenderoth, Lind & Ponack, L.L.P.

(57) ABSTRACT

A zoom lens system includes a first lens group having a positive power, a second lens group that has a negative power and includes one lens element, a third lens group that has a positive power and includes at least two lens elements, and a subsequent lens group that has a positive power as a whole and includes at least two lens groups in order from an object side to an image side. In zooming operation, at least the first lens group to the third lens group move along an optical axis, and a condition of $-9.0<fG1/fG2<-2.0$ is satisfied. Where fG1 represents a focal distance of the first lens group and fG2 represents a focal distance of the second lens group.

11 Claims, 16 Drawing Sheets

ZOOM LENS SYSTEM, IMAGING DEVICE, AND CAMERA

BACKGROUND OF THE INVENTION

1. Field of the Invention

The present disclosure provides a zoom lens system having high optical performance over a whole zoom region, and an imaging device and a camera that are provided with the zoom lens system.

2. Description of the Related Art

Unexamined Japanese Patent Publication No. 10-333038 discloses a zoom lens system that includes a six-group configuration having positive, negative, positive, positive, negative, and positive powers to perform zooming by changing an interval between the groups.

Because image quality of the imaging device and the camera is enhanced year by year, there is a demand to improve the optical performance of the zoom lens system used in the imaging device and the camera.

An object of the present disclosure is to provide a zoom lens system having high optical performance over a whole zoom region.

SUMMARY OF THE INVENTION

A zoom lens system according to the present disclosure includes a first lens group having a positive power, a second lens group that has a negative power and includes one lens element, a third lens group that has a positive power and includes at least two lens elements, and a subsequent lens group that has a positive power as a whole and includes at least two lens groups in order from an object side to an image side. In zooming operation, at least the first lens group to the third lens group move along an optical axis, and a condition of $-9.0 < fG1/fG2 < -2.0$ is satisfied. Where $fG1$ represents a focal distance of the first lens group and $fG2$ represents a focal distance of the second lens group.

The present disclosure provides the zoom lens system having the high optical performance over the whole zoom region.

DETAILED DESCRIPTION OF THE PREFERRED EMBODIMENTS

FIGS. 1, 4, 7, 10, and 13 are views illustrating lens dispositions of zoom lens systems according to first to fifth exemplary embodiments, and express the zoom lens systems in an infinity object focusing state.

In FIGS. 1, 4, 7, 10, and 13, a part (a) illustrates a lens configuration of a wide angle end (shortest focal distance state: focal distance fW), a part (b) illustrates a lens configuration of an intermediate position (intermediate focal distance state: focal distance $fM=\sqrt{(fW*fT)}$), and a part (c) illustrates a lens configuration of a telephoto end (longest focal distance state: focal distance fT). In FIGS. 1, 4, 7, 10, and 13, a polygonal-line arrow provided between the parts (a) and (b) is obtained by connecting positions of the lens groups in the wide angle end, the intermediate position, and the telephoto end in the order from the top. The wide angle end and the intermediate position are simply connected to each other by a straight line, the intermediate position and the telephoto end are simply connected to each other by a straight line, and the straight lines differ from actual movement of each lens group.

In FIGS. 1, 4, 7, 10, and 13, the arrow provided to the lens group indicates focusing from the infinity object focusing state to a proximity object focusing state. That is, in FIGS. 1, 4, 7, 10, and 13, the arrow indicates a direction in which fourth lens group G4 to be described later moves during the focusing from the infinity object focusing state to the proximity object focusing state. In FIGS. 1, 4, 7, 10, and 13, because the numeral of each lens group is provided to the part (a), the arrow indicating the focusing is provided below the sign of each lens group for convenience. A direction to which each lens group is to be moved during the focusing in each zooming state is specifically described later in each exemplary embodiment.

An asterisk "*" provided to a specific surface in FIGS. 1, 4, 7, 10, and 13 indicates that the surface is an aspherical surface. In FIGS. 1, 4, 7, 10, and 13, a sign (+) and a sign (−), which are provided to the numeral of each lens group, correspond to the numeral of power of each lens group. In FIGS. 1, 4, 7, 10, and 13, a rightmost straight line indicates an image plane position of imaging element S.

As illustrated in FIGS. 1, 4, 7, 10, and 13, aperture diaphragm A is provided at a predetermined position.

First Exemplary Embodiment

Figure 1:
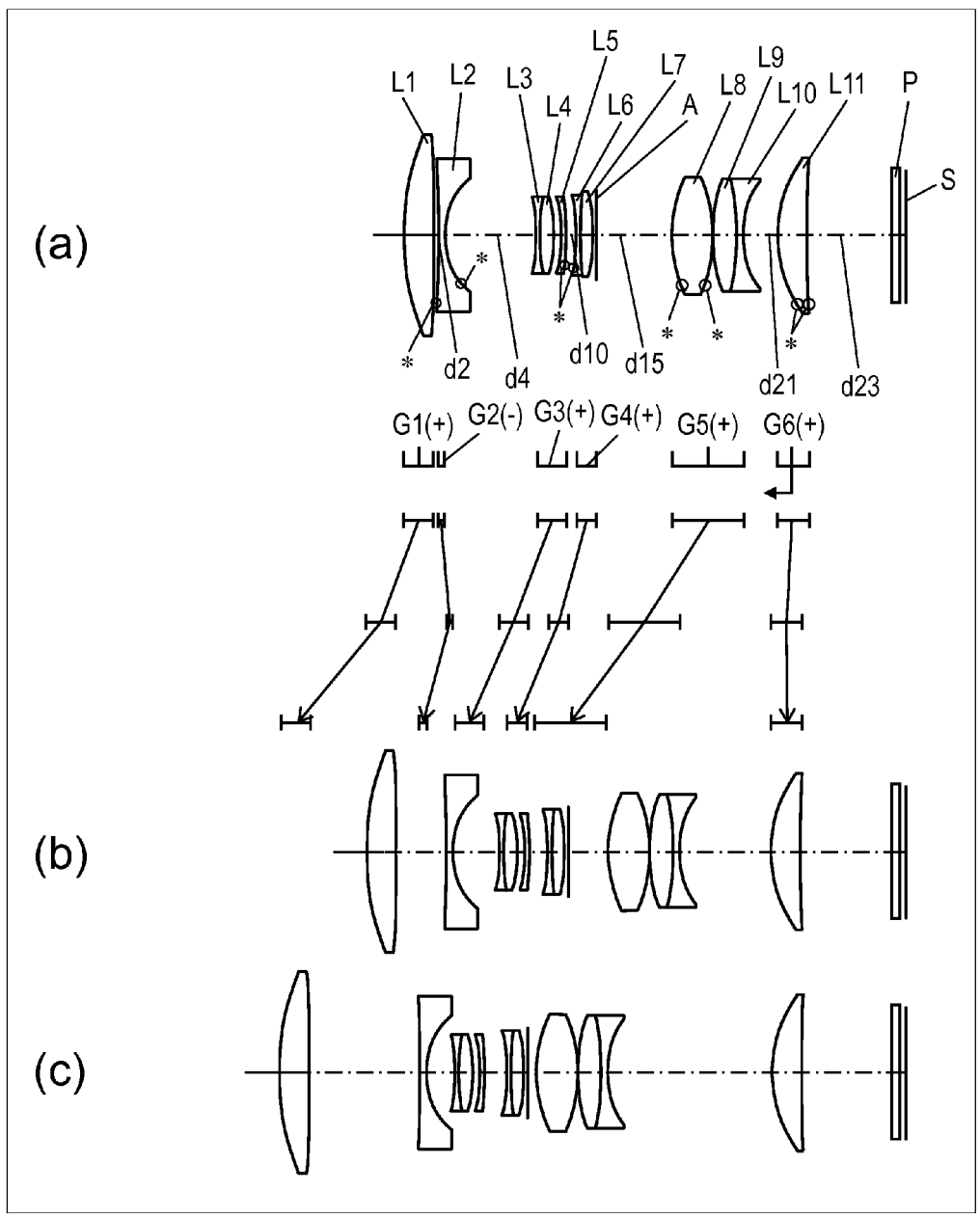
FIG. 1 is a view illustrating a lens disposition in an infinity object focusing state of a zoom lens system according to a first exemplary embodiment.
Figure 2:
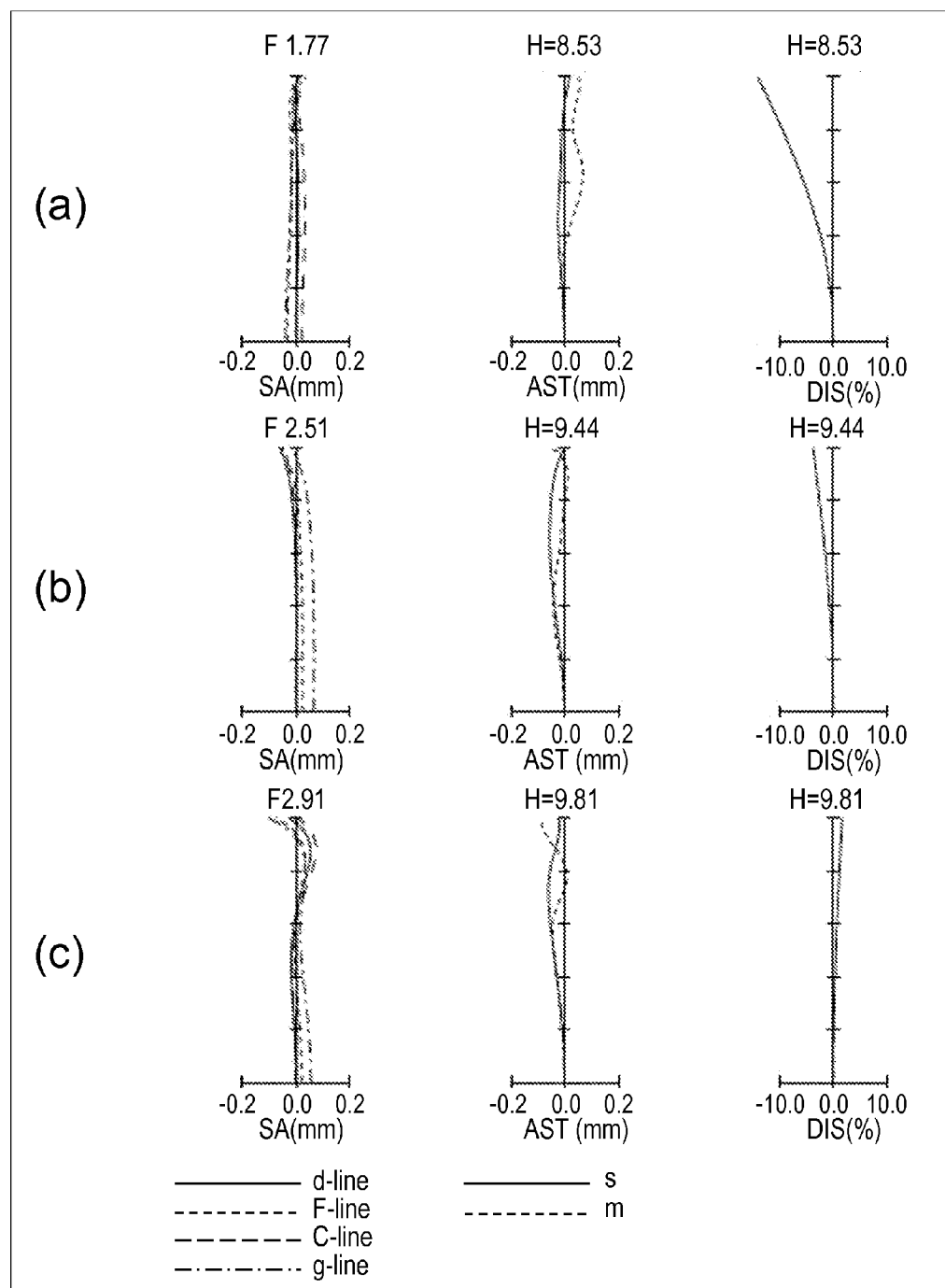
FIG. 2 is a longitudinal aberration diagram in the infinity object focusing state of a zoom lens system according to Example 1.
Figure 3:
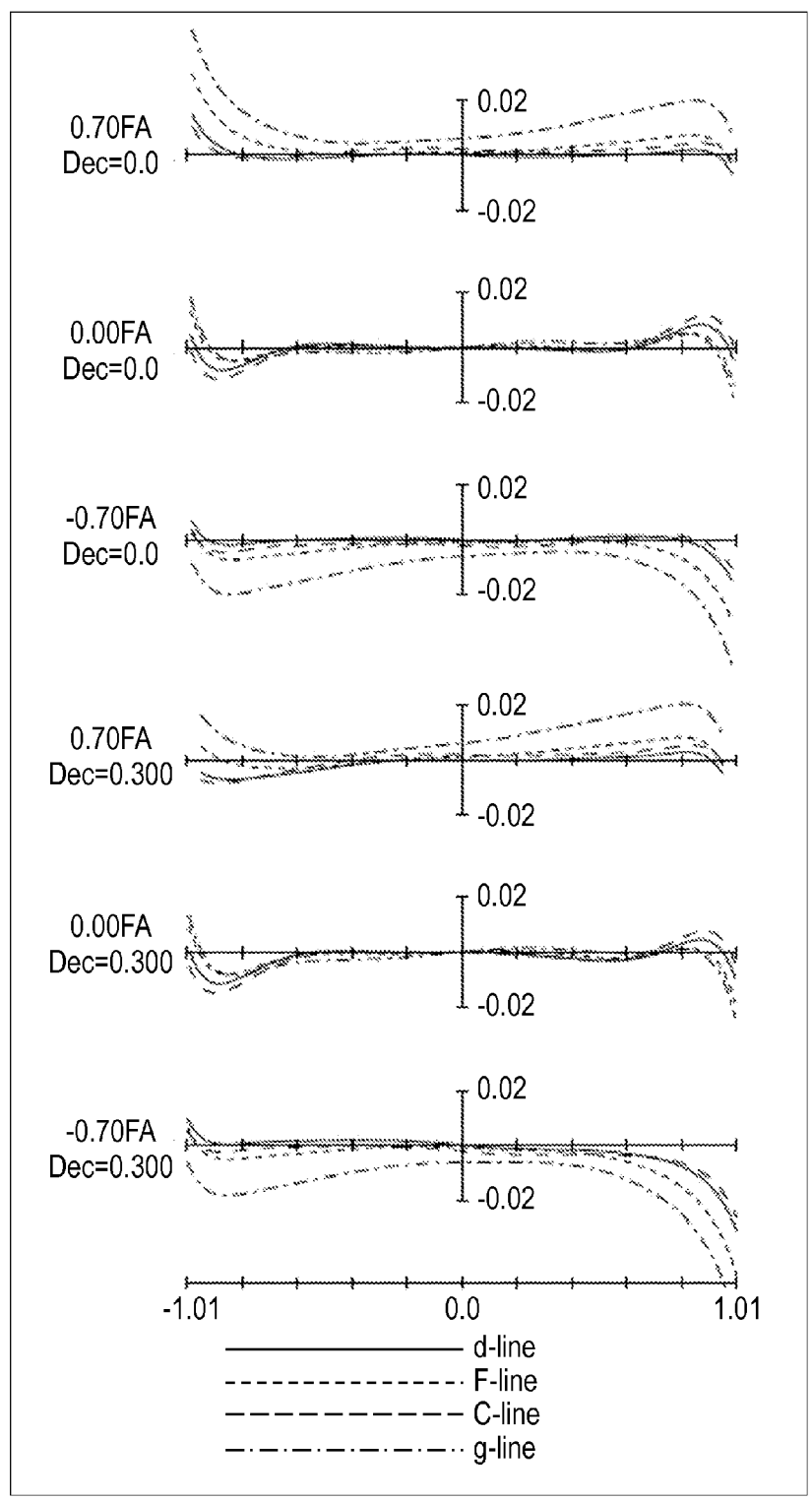
FIG. 3 is transverse aberration diagrams in a basic state in which image blurring correction is not performed and an image blurring correction state at a telephoto end of the zoom lens system of Example 1.

FIG. 1 is a view illustrating a lens disposition in an infinity object focusing state of a zoom lens system according to a first exemplary embodiment.

The zoom lens system includes first lens group G1 having a positive power, second lens group G2 having a negative power, third lens group G3 having the positive power, fourth lens group G4 having the positive power, fifth lens group G5 having the positive power, sixth lens group G6 having the positive power, and parallel plate P in the order from an object side to an image side.

First lens group G1 is a single lens constructed with first lens element L1 having the positive power.

Second lens group G2 is a single lens constructed with second lens element L2 having the negative power.

Third lens group G3 includes third lens element L3 having the negative power, fourth lens element L4 having the positive power, and fifth lens element L5 having the negative power in the order from the object side to the image side. Third lens element L3 and fourth lens element L4 are a cemented lens in which third lens element L3 and fourth lens element L4 adhere to each other using an adhesive.

Fourth lens group G4 includes sixth lens element L6 having the negative power, seventh lens element L7 having the positive power, and aperture diaphragm A in the order from the object side to the image side. Sixth lens element L6 and seventh lens element L7 are a cemented lens in which sixth lens element L6 and seventh lens element L7 adhere to each other using the adhesive.

Fifth lens group G5 includes eighth lens element L8 having the positive power, ninth lens element L9 having the positive power, and tenth lens element L10 having the negative power in the order from the object side to the image side. Ninth lens element L9 and tenth lens element L10 are a cemented lens in which ninth lens element L9 and tenth lens element L10 adhere to each other using the adhesive.

Sixth lens group G6 is a single lens constructed with eleventh lens element L11 having the positive power.

The lens elements will be described.

The lens element in first lens group G1 will be described. First lens element L1 is a biconvex lens.

The lens element in second lens group G2 will be described. Second lens element L2 is a biconcave lens having aspherical shapes on the object side and the image side.

The lens elements in third lens group G3 will be described. Third lens element L3 is a biconcave lens. Fourth lens element L4 is a biconvex lens. Fifth lens element L5 is a meniscus lens that includes a concave surface on the object side, and has the aspherical shape on the image side.

The lens elements in fourth lens group G4 will be described. Sixth lens element L6 is a biconcave lens having the aspherical shape on the object side. Seventh lens element L7 is a biconvex lens.

The lens element in fifth lens group G5 will be described. Eighth lens element L8 is a biconvex lens having the aspherical shapes on the object side and the image side. Ninth lens element L9 is a biconvex lens. Tenth lens element L10 is a biconcave lens.

The lens element in sixth lens group G6 will be described. Eleventh lens element L11 is a biconvex lens having the aspherical shapes on the object side and the image side.

In the zoom lens system of the first exemplary embodiment, in the zooming from the wide angle end to the telephoto end during photographing, first lens group G1, third lens group G3, fourth lens group G4, fifth lens group G5, and sixth lens group G6 move onto the object side, and second lens group G2 moves onto the image side while drawing a convex locus. That is, in the zooming, each lens group moves along an optical axis such that an interval between first lens group G1 and second lens group G2 and an interval between fifth lens group G5 and sixth lens group G6 increase, and such that an interval between second lens group G2 and third lens group G3 decreases.

In the zoom lens system of the first exemplary embodiment, sixth lens group G6 moves onto the object side along the optical axis in the focusing from the infinity object focusing state to the proximity object focusing state.

Third lens element L3 and fourth lens element L4 (image blurring correction lens elements) of third lens group G3 move in a direction perpendicular to the optical axis in order to optically correct image blurring. In the zoom lens system, the image blurring correction lens element can correct image point movement caused by a vibration of a whole system. That is, the zoom lens system can optically correct the image blurring caused by camera shake and the vibration.

Second Exemplary Embodiment

Figure 4:
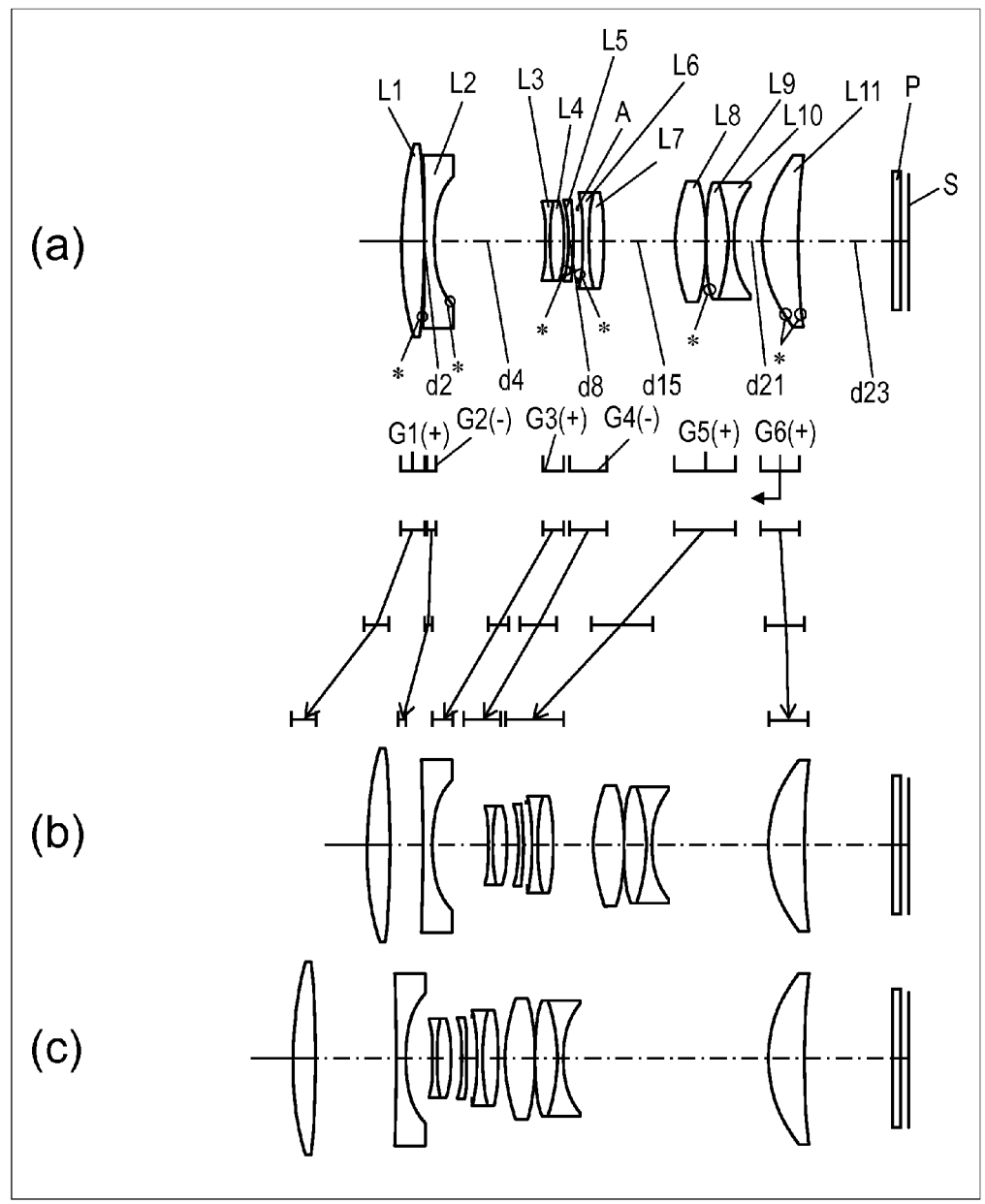
FIG. 4 is a view illustrating the lens disposition in the infinity object focusing state of a zoom lens system according to a second exemplary embodiment.
Figure 5:
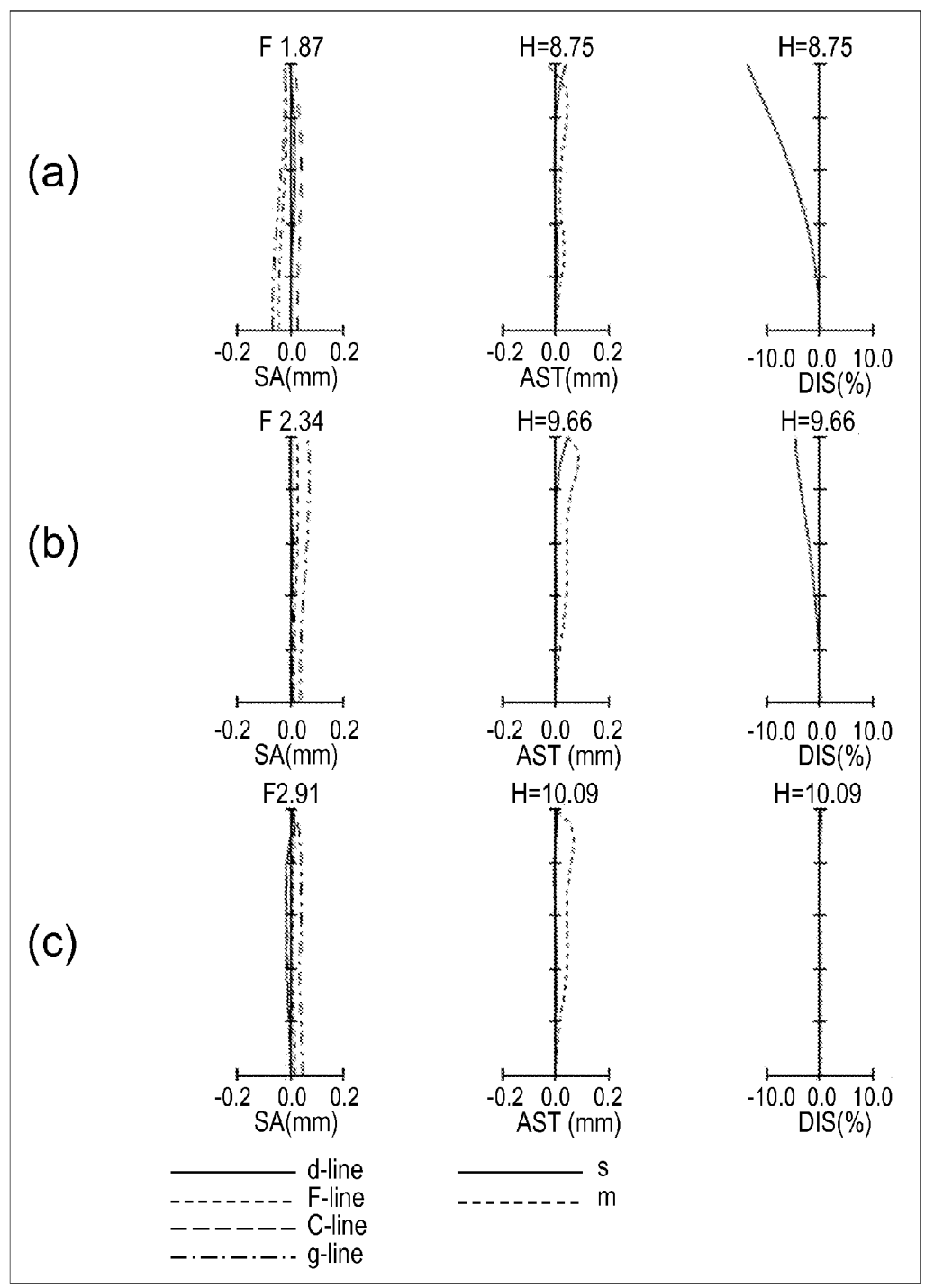
FIG. 5 is a longitudinal aberration diagram in the infinity object focusing state of a zoom lens system according to Example 2.
Figure 6:
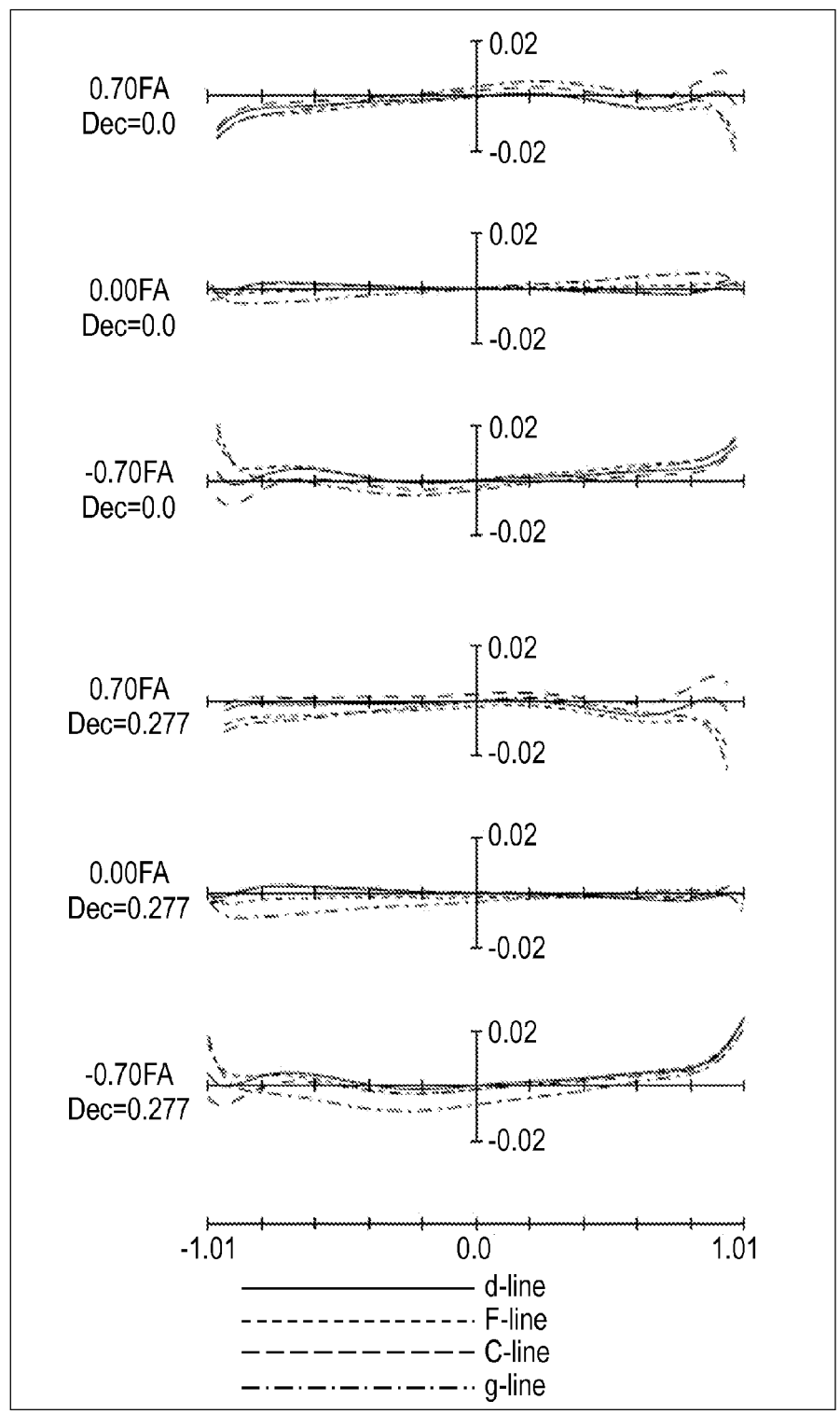
FIG. 6 is transverse aberration diagrams in the basic state in which the image blurring correction is not performed and the image blurring correction state at the telephoto end of the zoom lens system of Example 2.

FIG. 4 is a view illustrating the lens disposition in the infinity object focusing state of a zoom lens system according to a second exemplary embodiment.

The zoom lens system includes first lens group G1 having the positive power, second lens group G2 having the negative power, third lens group G3 having the positive power, fourth lens group G4 having the negative power, fifth lens group G5 having the positive power, sixth lens group G6 having the positive power, and parallel plate P in the order from an object side to an image side.

First lens group G1 is a single lens constructed with first lens element L1 having the positive power.

Second lens group G2 is a single lens constructed with second lens element L2 having the negative power.

Third lens group G3 includes third lens element L3 having the negative power and fourth lens element L4 having the positive power in the order from the object side to the image side. Third lens element L3 and fourth lens element L4 are a cemented lens in which third lens element L3 and fourth lens element L4 adhere to each other using an adhesive.

Fourth lens group G4 includes fifth lens element L5 having the negative power, aperture diaphragm A, sixth lens element L6 having the negative power, and seventh lens element L7 having the positive power in the order from the object side to the image side. Sixth lens element L6 and seventh lens element L7 are a cemented lens in which sixth lens element L6 and seventh lens element L7 adhere to each other using the adhesive.

Fifth lens group G5 includes eighth lens element L8 having the positive power, ninth lens element L9 having the positive power, and tenth lens element L10 having the negative power in the order from the object side to the image side. Ninth lens element L9 and tenth lens element L10 are a cemented lens in which ninth lens element L9 and tenth lens element L10 adhere to each other using the adhesive.

Sixth lens group G6 is a single lens constructed with eleventh lens element L11 having the positive power.

The lens elements will be described.

The lens element in first lens group G1 will be described. First lens element L1 is a biconvex lens.

The lens element in second lens group G2 will be described. Second lens element L2 is a biconcave lens having aspherical shapes on the object side and the image side.

The lens elements in third lens group G3 will be described. Third lens element L3 is a biconcave lens. Fourth lens element L4 is a biconvex lens.

The lens elements in fourth lens group G4 will be described. Fifth lens element L5 is a meniscus lens that includes the concave surface on the object side, and has the aspherical shape on the object side and the image side. Sixth lens element L6 is a biconcave lens having the aspherical shape on the object side. Seventh lens element L7 is a biconvex lens.

The lens element in fifth lens group G5 will be described. Eighth lens element L8 is a biconvex lens. Ninth lens element L9 is a biconvex lens having the aspherical shape on the object side. Tenth lens element L10 is a biconcave lens.

The lens element in sixth lens group G6 will be described. Eleventh lens element L11 is a meniscus lens that includes a convex surface on the object side, and has the aspherical shape on the object side and the image side.

In the zoom lens system of the second exemplary embodiment, in the zooming from the wide angle end to the telephoto end during the photographing, first lens group G1, second lens group G2, third lens group G3, fourth lens group G4, and fifth lens group G5 move onto the object side, and sixth lens group G6 moves onto the image side. That is, in the zooming, each lens group moves along the optical axis such that the interval between fifth lens group G5 and sixth lens group G6 increases.

In the zoom lens system of the second exemplary embodiment, sixth lens group G6 moves onto the object side along the optical axis in the focusing from the infinity object focusing state to the proximity object focusing state.

Third lens group G3 (image blurring correction lens group) moves in the direction perpendicular to the optical axis in order to optically correct the image blurring. In the zoom lens system, third lens group G3 can correct the image point movement caused by the vibration of the whole system. That is, the zoom lens system can optically correct the image blurring caused by camera shake and the vibration.

Third Exemplary Embodiment

Figure 7:
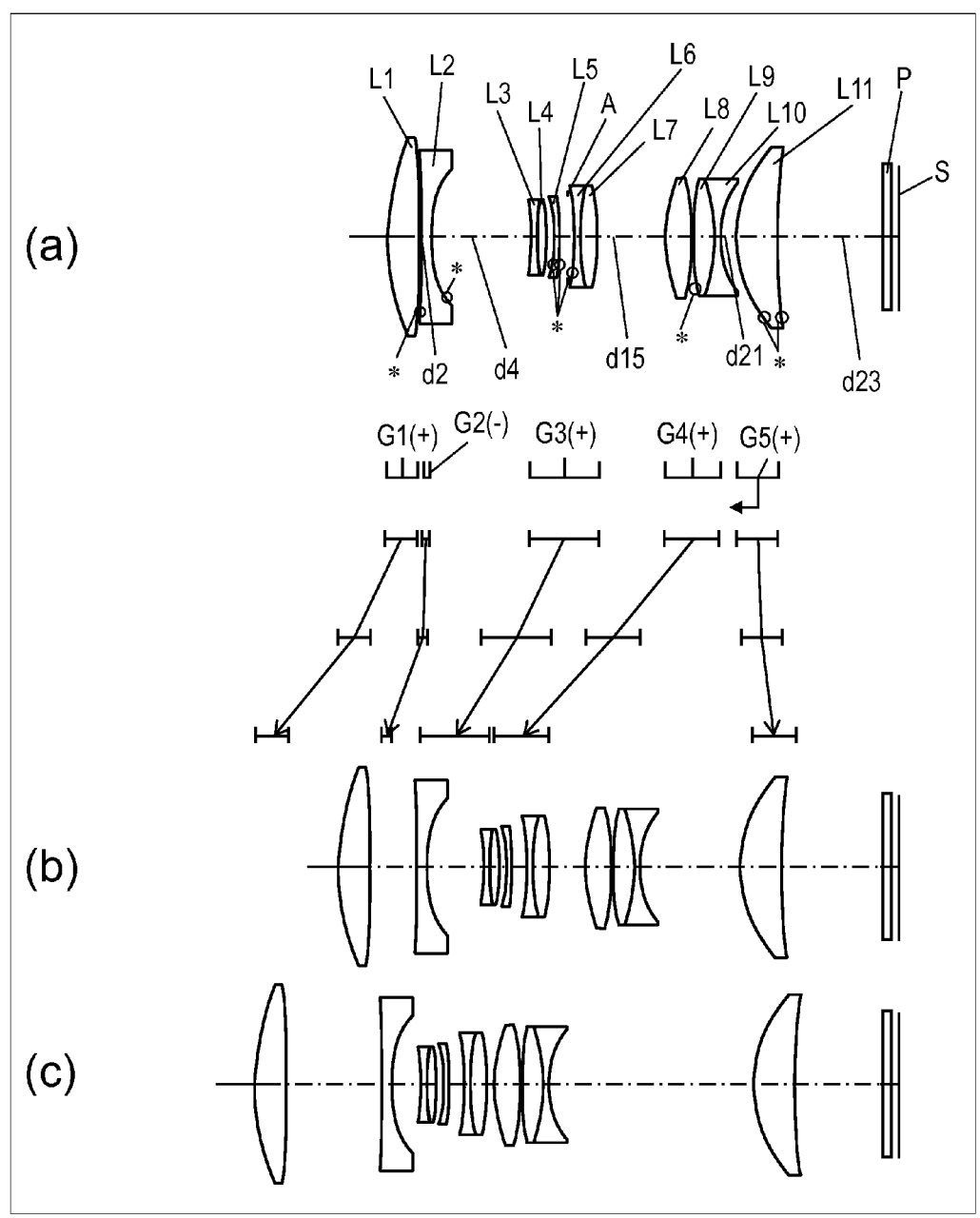
FIG. 7 is a view illustrating the lens disposition in the infinity object focusing state of a zoom lens system according to a third exemplary embodiment.
Figure 8:
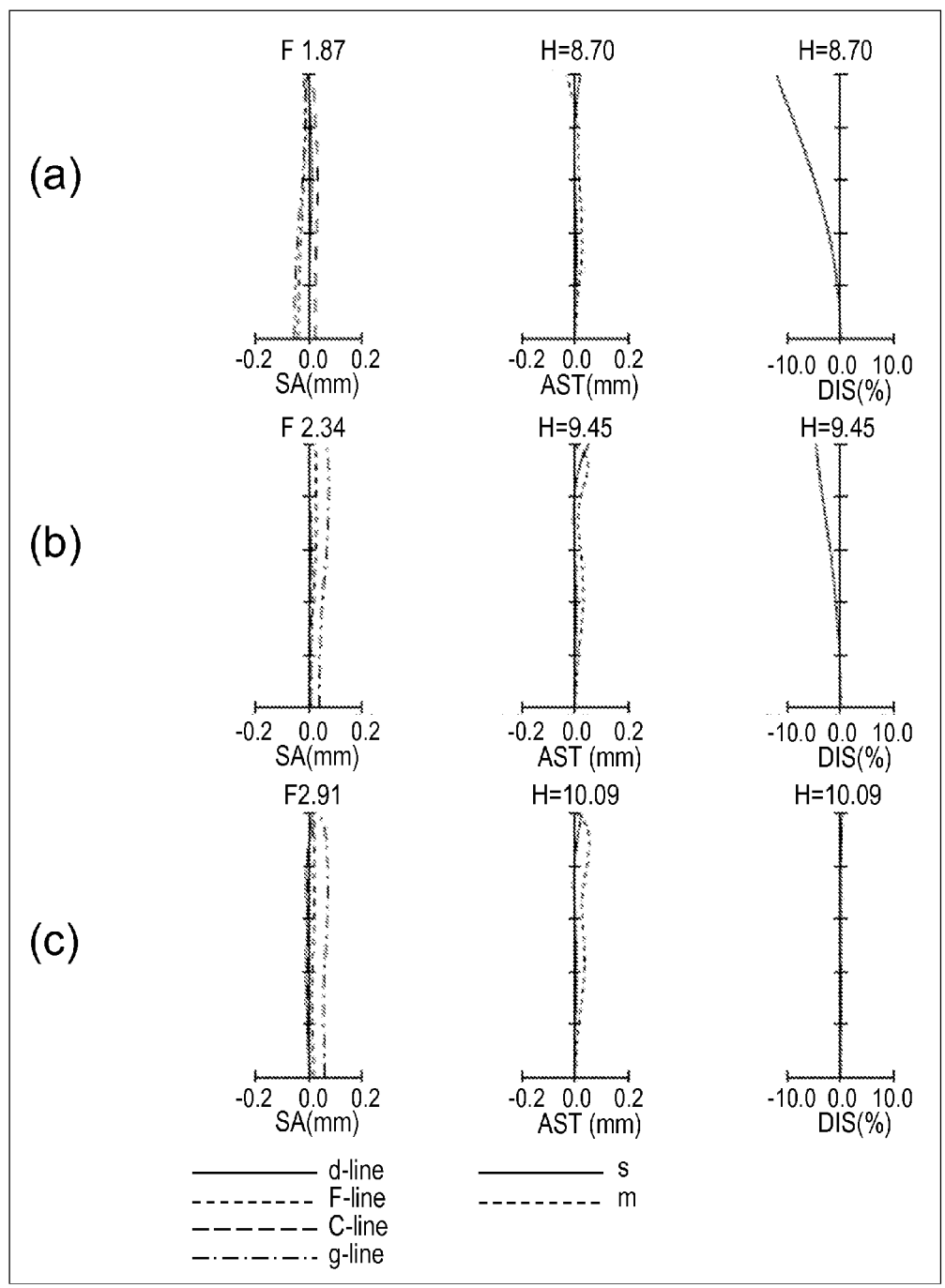
FIG. 8 is a longitudinal aberration diagram in the infinity object focusing state of a zoom lens system according to Example 3.
Figure 9:
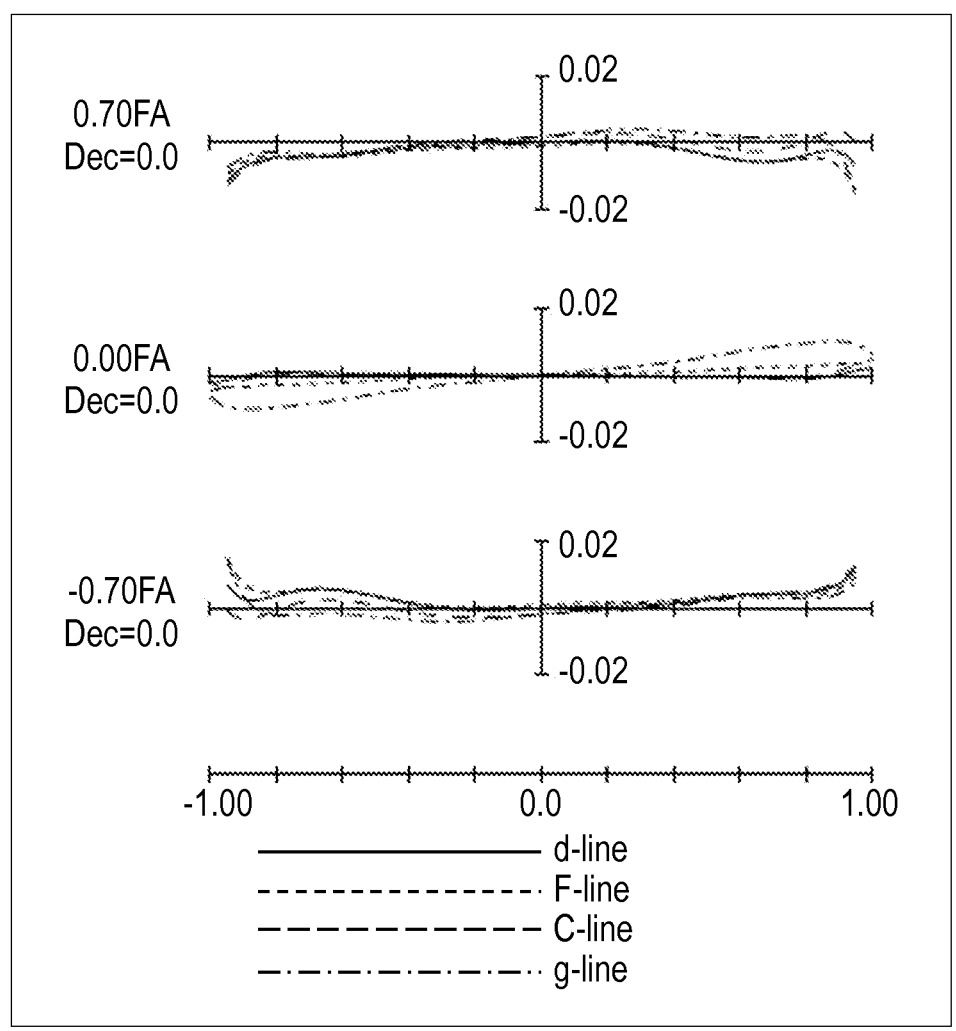
FIG. 9 is transverse aberration diagrams in the basic state in which the image blurring correction is not performed and the image blurring correction state at the telephoto end of the zoom lens system of Example 3.

FIG. 7 is a view illustrating the lens disposition in the infinity object focusing state of a zoom lens system according to a third exemplary embodiment.

The zoom lens system includes first lens group G1 having the positive power, second lens group G2 having the negative power, third lens group G3 having the positive power, fourth lens group G4 having the positive power, fifth lens group G5 having the positive power, and parallel plate P in the order from an object side to an image side.

First lens group G1 is a single lens constructed with first lens element L1 having the positive power.

Second lens group G2 is a single lens constructed with second lens element L2 having the negative power.

Third lens group G3 includes third lens element L3 having the negative power, fourth lens element L4 having the positive power, fifth lens element L5 having the negative power, aperture diaphragm A, sixth lens element L6 having the negative power, and seventh lens element L7 having the positive power in the order from the object side to the image side. Third lens element L3 and fourth lens element L4 are a cemented lens in which third lens element L3 and fourth lens element L4 adhere to each other using an adhesive. Sixth lens element L6 and seventh lens element L7 are a cemented lens in which sixth lens element L6 and seventh lens element L7 adhere to each other using the adhesive.

Fourth lens group G4 includes eighth lens element L8 having the positive power, ninth lens element L9 having the positive power, and tenth lens element L10 having the negative power in the order from the object side to the image side. Ninth lens element L9 and tenth lens element L10 are a cemented lens in which ninth lens element L9 and tenth lens element L10 adhere to each other using the adhesive.

Fifth lens group G5 is a single lens constructed with eleventh lens element L11 having the positive power.

The lens elements will be described.

The lens element in first lens group G1 will be described. First lens element L1 is a biconvex lens.

The lens element in second lens group G2 will be described. Second lens element L2 is a biconcave lens having aspherical shapes on the object side and the image side.

The lens elements in third lens group G3 will be described. Third lens element L3 is a biconcave lens. Fourth lens element L4 is a biconvex lens. Fifth lens element L5 is a meniscus lens that includes the concave surface on the object side, and has the aspherical shape on the object side and the image side. Sixth lens element L6 is a biconcave lens having the aspherical shape on the object side. Seventh lens element L7 is a biconvex lens.

The lens elements in fourth lens group G4 will be described. Eighth lens element L8 is a biconvex lens. Ninth lens element L9 is a biconvex lens having the aspherical shape on the object side. Tenth lens element L10 is a biconcave lens.

The lens element in fifth lens group G5 will be described. Eleventh lens element L11 is a meniscus lens that includes a convex surface on the object side, and has the aspherical shape on the object side and the image side.

In the zoom lens system of the third exemplary embodiment, in the zooming from the wide angle end to the telephoto end during the photographing, first lens group G1, second lens group G2, third lens group G3, and fourth lens group G4 move onto the object side, and fifth lens group G5 moves onto the image side. That is, in the zooming, each lens group moves along the optical axis such that the interval between fourth lens group G4 and fifth lens group G5 increases.

In the zoom lens system of the third exemplary embodiment, fifth lens group G5 moves onto the object side along the optical axis in the focusing from the infinity object focusing state to the proximity object focusing state.

Fourth Exemplary Embodiment

Figure 10:
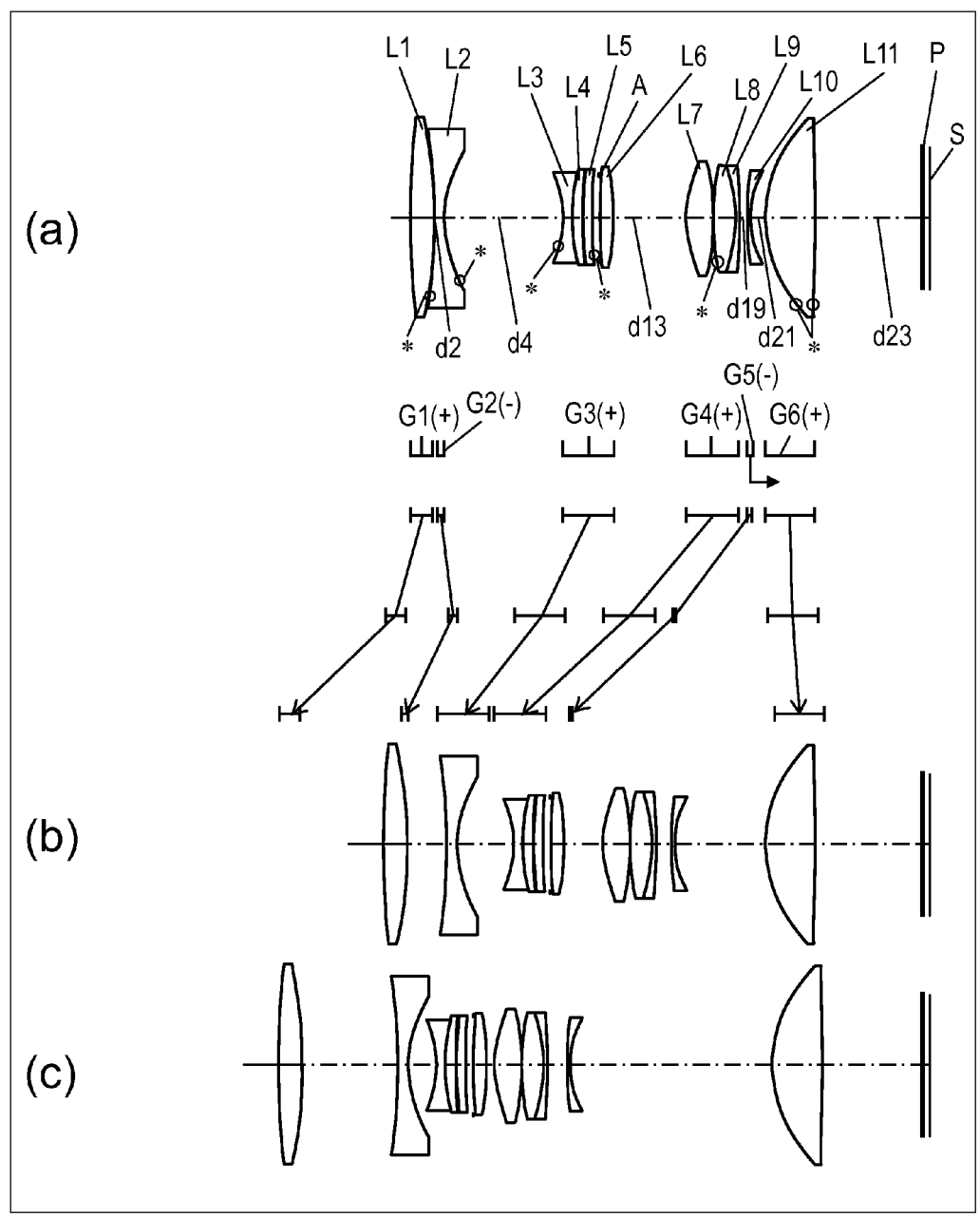
FIG. 10 is a view illustrating the lens disposition in the infinity object focusing state of a zoom lens system according to a fourth exemplary embodiment.
Figure 11:
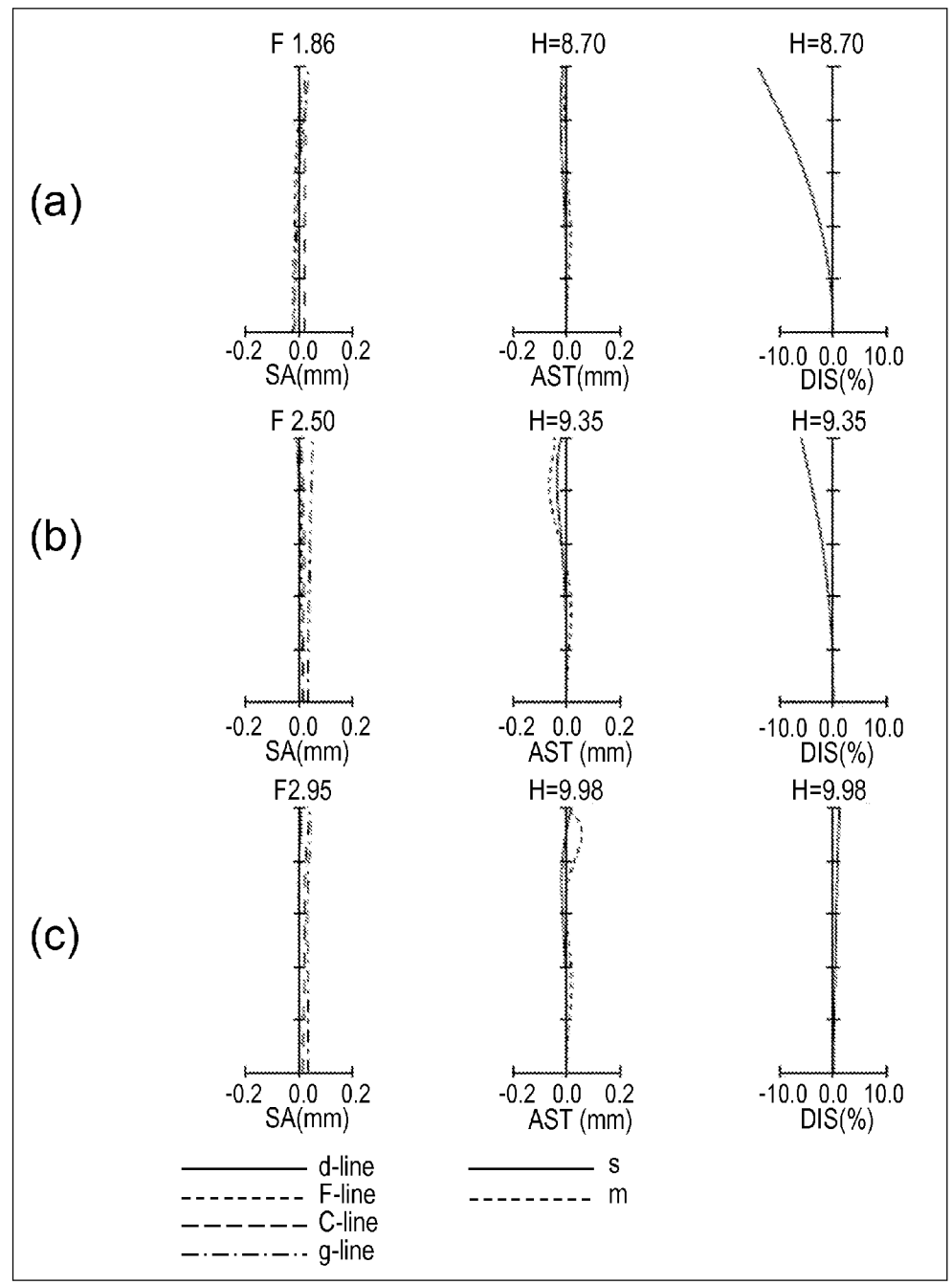
FIG. 11 is a longitudinal aberration diagram in the infinity object focusing state of a zoom lens system according to Example 4.
Figure 12:
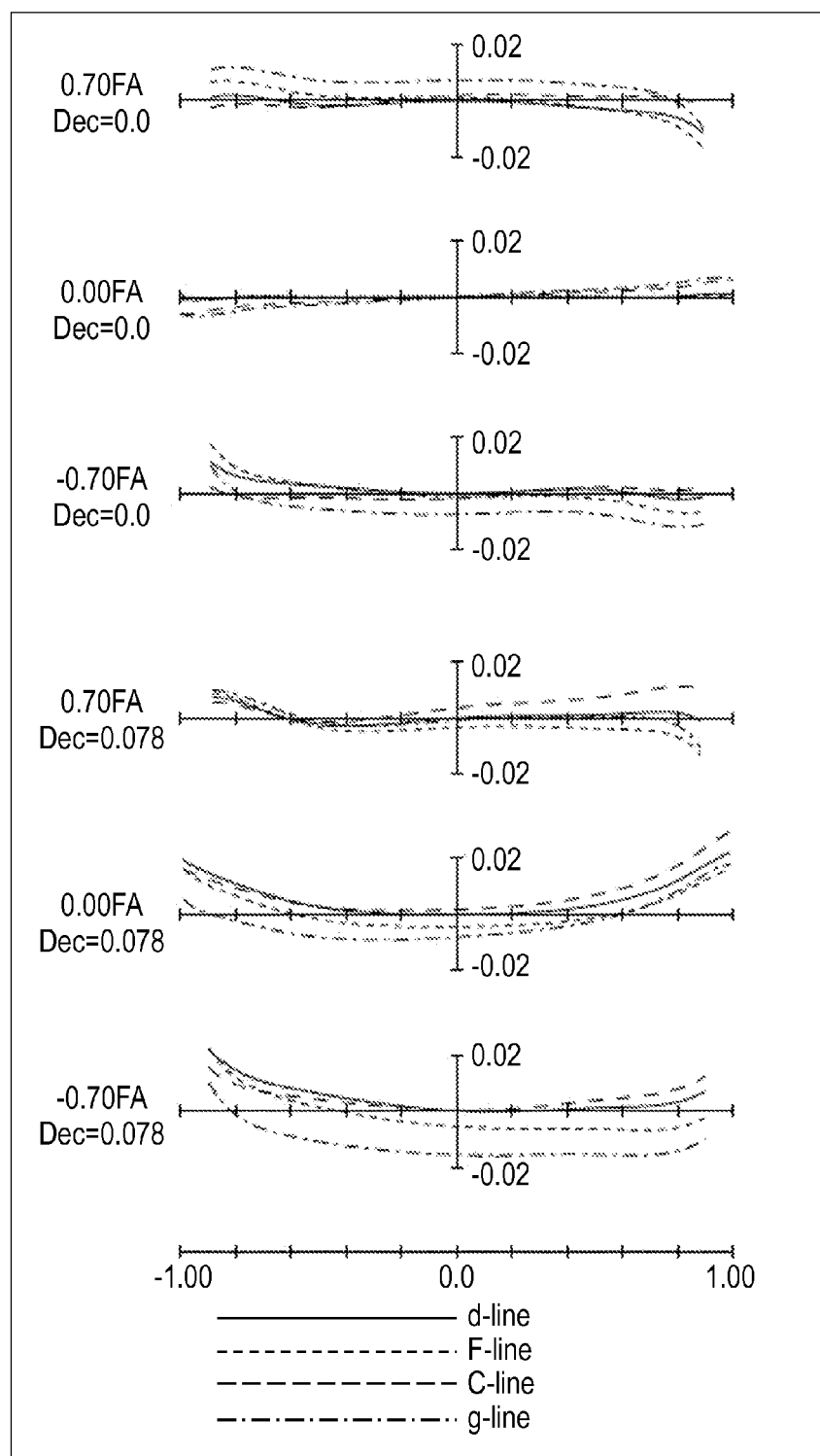
FIG. 12 is transverse aberration diagrams in the basic state in which the image blurring correction is not performed and the image blurring correction state at the telephoto end of the zoom lens system of Example 4.

FIG. 10 is a view illustrating the lens disposition in the infinity object focusing state of a zoom lens system according to a fourth exemplary embodiment.

The zoom lens system includes first lens group G1 having the positive power, second lens group G2 having the negative power, third lens group G3 having the positive power, fourth lens group G4 having the positive power, fifth lens group G5 having the negative power, sixth lens group G6 having the positive power, and parallel plate P in the order from an object side to an image side.

First lens group G1 is a single lens constructed with first lens element L1 having the positive power.

Second lens group G2 is a single lens constructed with second lens element L2 having the negative power.

Third lens group G3 includes third lens element L3 having the negative power, fourth lens element L4 having the positive power, fifth lens element L5 having the positive power, aperture diaphragm A, and sixth lens element L6 having the positive power in the order from the object side to the image side. Third lens element L3 and fourth lens element L4 are a cemented lens in which third lens element L3 and fourth lens element L4 adhere to each other using the adhesive.

Fourth lens group G4 includes seventh lens element L7 having the positive power, eighth lens element L8 having the positive power, and ninth lens element L9 having the negative power in the order from the object side to the image side. Eighth lens element L8 and ninth lens element L9 are a cemented lens in which eighth lens element L8 and ninth lens element L9 adhere to each other using the adhesive.

Fifth lens group G5 is a single lens constructed with tenth lens element L10 having the negative power.

Sixth lens group G6 is a single lens constructed with eleventh lens element L11 having the positive power.

The lens elements will be described.

The lens element in first lens group G1 will be described. First lens element L1 is a biconvex lens.

The lens element in second lens group G2 will be described. Second lens element L2 is a biconcave lens having aspherical shapes on the object side and the image side.

The lens elements in third lens group G3 will be described. Third lens element L3 is a biconcave lens having the aspherical shape on the object side. Fourth lens element L4 is a meniscus lens including the convex surface on the object side. Fifth lens element L5 is a biconvex lens having the aspherical shape on the image side. Sixth lens element L6 is a biconvex lens.

The lens elements in fourth lens group G4 will be described. Seventh lens element L7 is a biconvex lens. Eighth lens element L8 is a biconvex lens having the aspherical shape on the object side. Ninth lens element L9 is a meniscus lens including the concave surface on the object side.

The lens element in fifth lens group G5 will be described. Tenth lens element L10 is a meniscus lens including the convex surface on the object side.

The lens element in sixth lens group G6 will be described. Eleventh lens element L11 is a biconvex lens having the aspherical shapes on the object side and the image side.

In the zoom lens system of the fourth exemplary embodiment, in the zooming from the wide angle end to the telephoto end during photographing, first lens group G1, third lens group G3, fourth lens group G4, and fifth lens group G5 move onto the object side, sixth lens group G6 moves onto the image side, and second lens group G2 moves onto the image side while drawing the convex locus. That is, in the zooming, each lens group moves along an optical axis such that the interval between fifth lens group G5 and sixth lens group G6 increases, and such that the interval between second lens group G2 and third lens group G3 decreases.

In the zoom lens system of the fourth exemplary embodiment, fifth lens group G5 moves onto the image side along the optical axis in the focusing from the infinity object focusing state to the proximity object focusing state.

Third lens element L3 and fourth lens element L4 (image blurring correction lens elements) of third lens group G3 move in a direction perpendicular to the optical axis in order to optically correct image blurring. The image blurring correction lens element of the zoom lens system can correct the image point movement caused by the vibration of the whole system, namely, the zoom lens system can optically correct the image blurring caused by camera shake and the vibration.

Fifth Exemplary Embodiment

Figure 13:
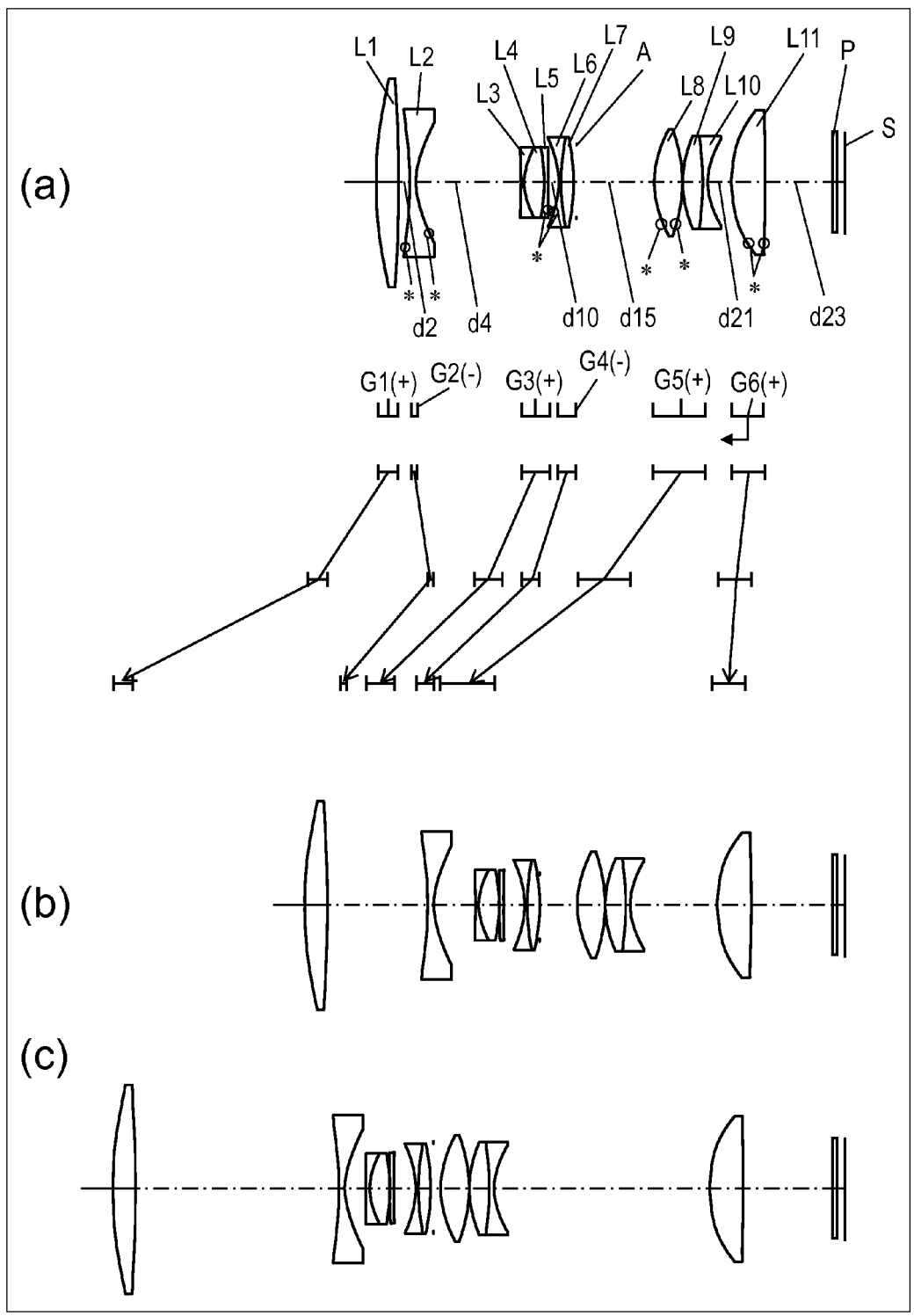
FIG. 13 is a view illustrating the lens disposition in the infinity object focusing state of a zoom lens system according to a fifth exemplary embodiment.
Figure 14:
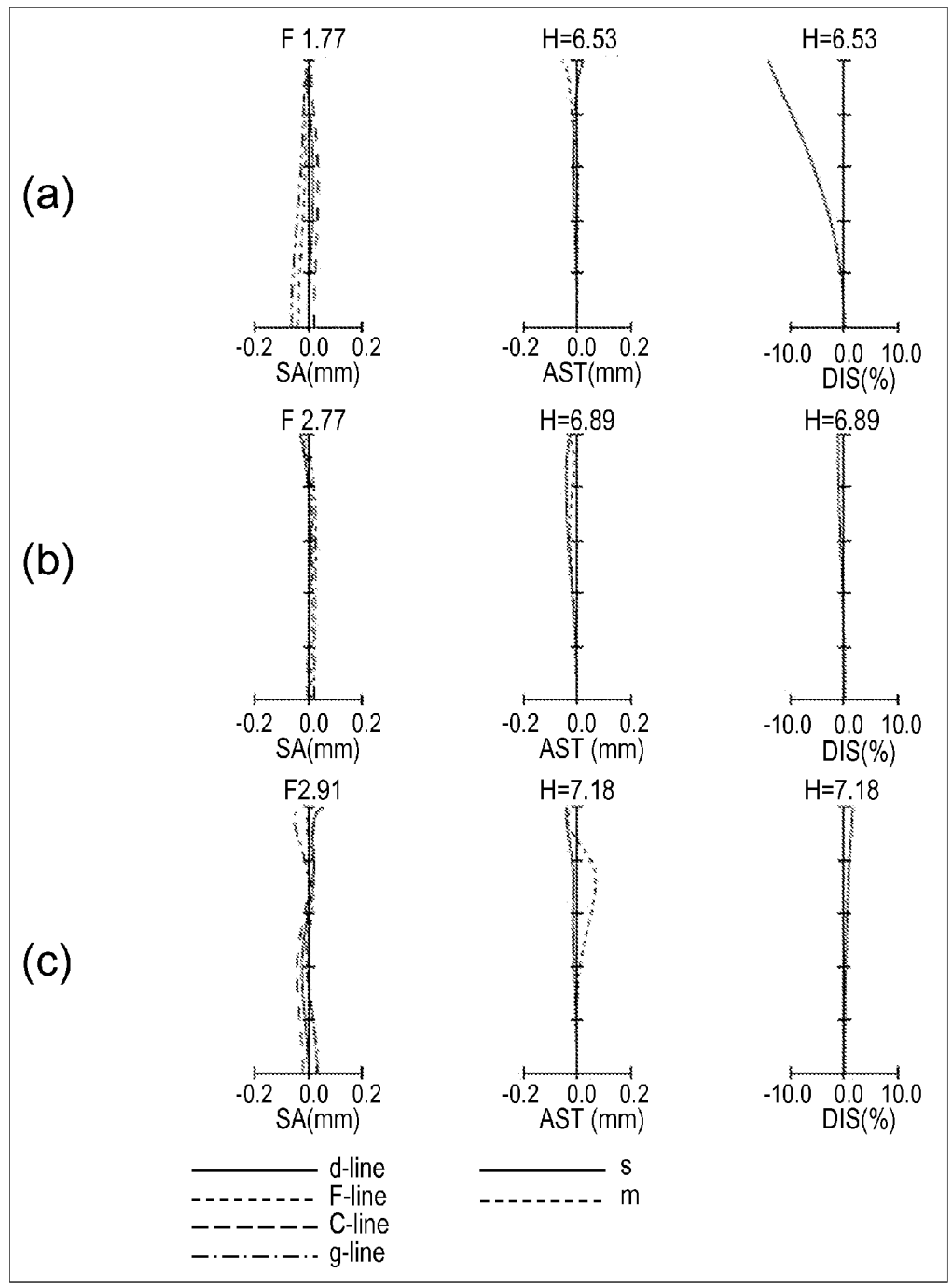
FIG. 14 is a longitudinal aberration diagram in the infinity object focusing state of a zoom lens system according to Example 5.
Figure 15:
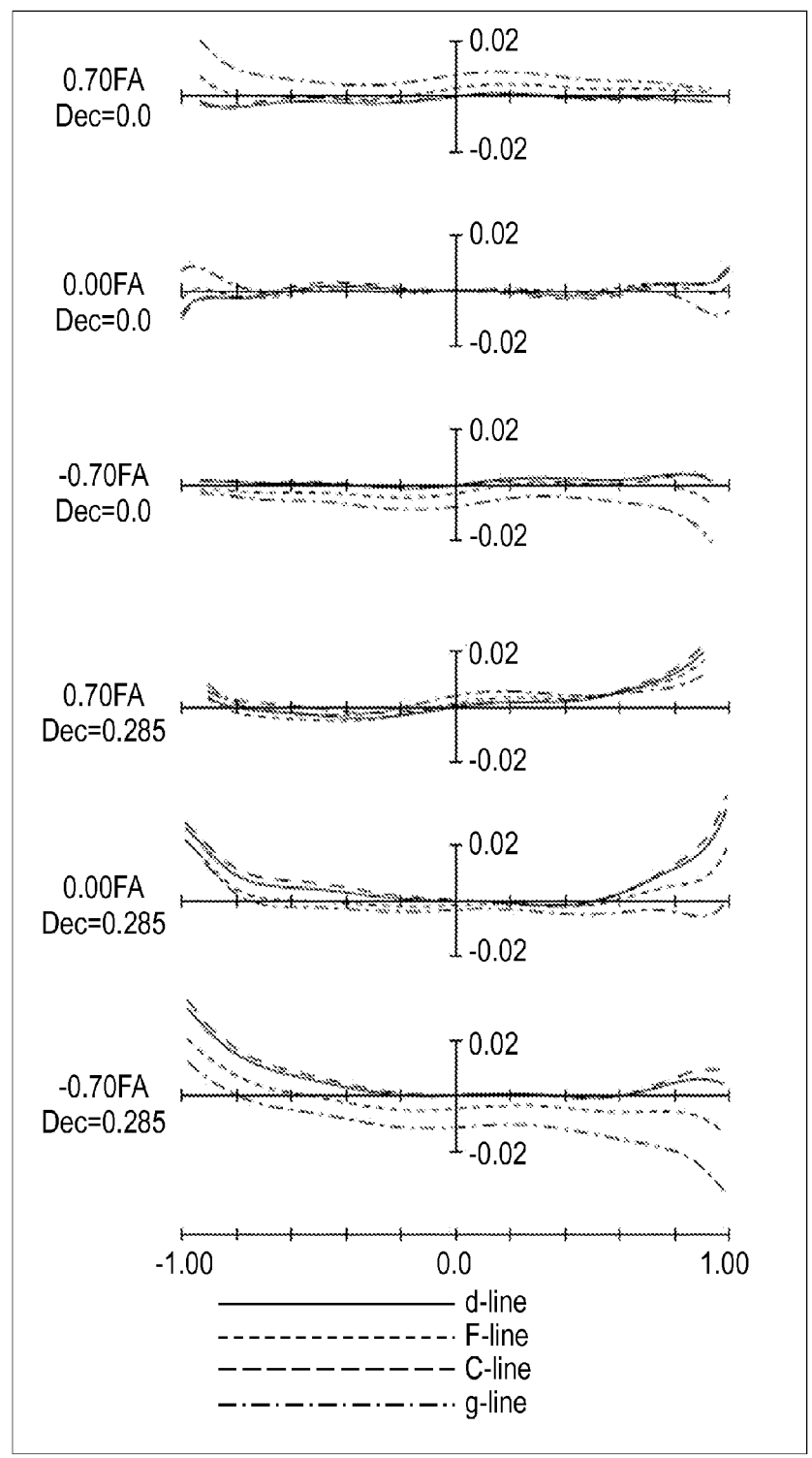
FIG. 15 is transverse aberration diagrams in the basic state in which the image blurring correction is not performed and the image blurring correction state at the telephoto end of the zoom lens system of Example 5.

FIG. 13 is a view illustrating the lens disposition in the infinity object focusing state of a zoom lens system according to a fifth exemplary embodiment.

The zoom lens system includes first lens group G1 having the positive power, second lens group G2 having the negative power, third lens group G3 having the positive power, fourth lens group G4 having the negative power, fifth lens group G5 having the positive power, sixth lens group G6 having the positive power, and parallel plate P in the order from an object side to an image side.

First lens group G1 is a single lens constructed with first lens element L1 having the positive power.

Second lens group G2 is a single lens constructed with second lens element L2 having the negative power.

Third lens group G3 includes third lens element L3 having the negative power, fourth lens element L4 having the positive power, and fifth lens element L5 having the negative power in the order from the object side to the image side. Third lens element L3 and fourth lens element L4 are a cemented lens in which third lens element L3 and fourth lens element L4 adhere to each other using the adhesive.

Fourth lens group G4 includes sixth lens element L6 having the negative power, seventh lens element L7 having the positive power, and aperture diaphragm A in the order from the object side to the image side. Sixth lens element L6 and seventh lens element L7 are a cemented lens in which sixth lens element L6 and seventh lens element L7 adhere to each other using the adhesive.

Fifth lens group G5 includes eighth lens element L8 having the positive power, ninth lens element L9 having the positive power, and tenth lens element L10 having the negative power in the order from the object side to the image side. Ninth lens element L9 and tenth lens element L10 are a cemented lens in which ninth lens element L9 and tenth lens element L10 adhere to each other using the adhesive.

Sixth lens group G6 is a single lens constructed with eleventh lens element L11 having the positive power.

The lens elements will be described.

The lens element in first lens group G1 will be described. First lens element L1 is a biconvex lens.

The lens element in second lens group G2 will be described. Second lens element L2 is a biconcave lens having aspherical shapes on the object side and the image side.

The lens elements in third lens group G3 will be described. Third lens element L3 is a biconcave lens. Fourth lens element L4 is a biconvex lens. Fifth lens element L5 is a meniscus lens that includes the concave surface on the object side, and has the aspherical shape on the image side.

The lens elements in fourth lens group G4 will be described. Sixth lens element L6 is a biconcave lens having the aspherical shape on the object side. Seventh lens element L7 is a biconvex lens.

The lens element in fifth lens group G5 will be described. Eighth lens element L8 is a biconvex lens having the aspherical shapes on the object side and the image side. Ninth lens element L9 is a biconvex lens. Tenth lens element L10 is a biconcave lens.

The lens element in sixth lens group G6 will be described. Eleventh lens element L11 is a biconvex lens having the aspherical shapes on the object side and the image side.

In the zoom lens system of the fifth exemplary embodiment, in the zooming from the wide angle end to the telephoto end during the photographing, first lens group G1, third lens group G3, fourth lens group G4, fifth lens group G5, and sixth lens group G6 move onto the object side, and second lens group G2 moves onto the image side while drawing the convex locus. That is, in the zooming, each lens group moves along the optical axis such that the interval between second lens group G2 and third lens group G3 decreases.

In the zoom lens system of the fifth exemplary embodiment, sixth lens group G6 moves onto the object side along the optical axis in the focusing from the infinity object focusing state to the proximity object focusing state.

Third lens element L3 and fourth lens element L4 (image blurring correction lens elements) of third lens group G3 move in a direction perpendicular to the optical axis in order to optically correct image blurring. The image blurring correction lens element of the zoom lens system can correct the image point movement caused by the vibration of the whole system, namely, the zoom lens system can optically correct the image blurring caused by camera shake and the vibration.

[Conditional Expression and Effect]

Desirable conditions of the zoom lens system of the first to fifth exemplary embodiments will be described below. A plurality of conditions are defined in the zoom lens systems of the first to fifth exemplary embodiments, and a configuration of the zoom lens system completely satisfying the plurality of conditions exerts the best effect. However, the zoom lens system exerting the corresponding effect can also be obtained by satisfying the individual condition.

Each of the zoom lens systems of the first to fifth exemplary embodiments includes first lens group G1 having the positive power, second lens group G2 having the negative power, third lens group G3 having the positive power, and a subsequent lens group that has the positive power as a whole and includes at least two lens groups in the order from the object side to the image side.

At least first lens group G1 to third lens group G3 move along the optical axis in zooming operation.

Desirably the zoom lens system satisfies the following conditional expression (1).

$$-9.0 < fG1/fG2 < -2.0 \tag{1}$$

where fG1 represents the focal distance of the first lens group, and fG2 represents the focal distance of the second lens group.

The conditional expression (1) defines a range suitable for a ratio of the focal distance of first lens group G1 and the focal distance of second lens group G2. It is possible to provide a compact zoom lens system having a large diameter but high optical performance over the whole zoom region by satisfying the conditional expression (1). Because the focal distance of first lens group G1 increases excessively if the value falls below a lower limit of the conditional expression (1), a movement amount of first lens group G1 increases in the zooming, and a lens total length increases excessively at the telephoto end. Therefore, it is difficult to provide the compact lens barrel or imaging device. If the value exceeds the upper limit of the conditional expression (1), the focal distance of first lens group G1 decreases excessively, thus making it difficult to correct various aberrations over the whole system, and to ensure the desired optical performance.

The effect can further be exerted by satisfying at least one of the following conditional expressions (1)' and (1)".

$$-7.0 < fG1/fG2 \tag{1}'$$

$$fG1/fG2 < -3.0 \tag{1}''$$

Additionally, for example, desirably the zoom lens system satisfies the following conditional expression (2).

$$1.0 < D34T/D34W < 3.0 \tag{2}$$

where

D34W represents the interval at the wide angle end between the third lens group and fourth lens group, and D34 T represents the interval at the telephoto end between the third lens group and the fourth lens group.

The conditional expression (2) defines a range suitable for a ratio of the interval at the telephoto end between third lens group G3 and fourth lens group G4 and the interval at the wide angle end between third lens group G3 and fourth lens group G4. Because the interval at the telephoto end between third lens group G3 and fourth lens group G4 decreases excessively if the value falls below the lower limit of the conditional expression (2), various aberrations corrected by third lens group G3 and fourth lens group G4, particularly a spherical aberration and a comatic aberration are excessively corrected, thus making it difficult to ensure the desired optical performance. Because the interval at the telephoto end between third lens group G3 and fourth lens group G4 decreases excessively if the value exceeds the upper limit of the conditional expression (2), various aberrations corrected by third lens group G3 and fourth lens group G4, particularly the spherical aberration and the comatic aberration are insufficiently corrected, thus making it difficult to ensure the desired optical performance.

The effect can further be exerted by satisfying at least one of the following conditional expressions (2)' and (2)".

$$1.5 < D34T/D34W \tag{2}'$$

$$D34T/D34W < 2.5 \tag{2}''$$

Finally, for example, desirably the zoom lens system satisfies the following conditional expression (3).

$$2.0 < LT/fT < 3.5 \tag{3}$$

where

LT represents a lens total length at the telephoto end, and fT represents the focal distance of the whole system at the telephoto end.

The conditional expression (3) defines a range suitable for a ratio of the lens total length at the telephoto end and the focal distance of the whole system at the telephoto end. The lens total length at the telephoto end is excessively shortened if the value falls below the lower limit of the conditional expression (3), thus making it difficult to successfully correct various aberrations, and to ensure the desired optical performance. The lens total length at the telephoto end increases excessively if the value exceeds the upper limit of the conditional expression (3), thus making it difficult to provide the compact lens barrel, imaging device, and camera.

The effect can further be exerted by satisfying at least one of the following conditional expressions (3)' and (3)".

$$2.5 < LT/fT \tag{3}'$$

$$LT/fT < 3.0 \tag{3}''$$

Sixth Exemplary Embodiment

Figure 16:
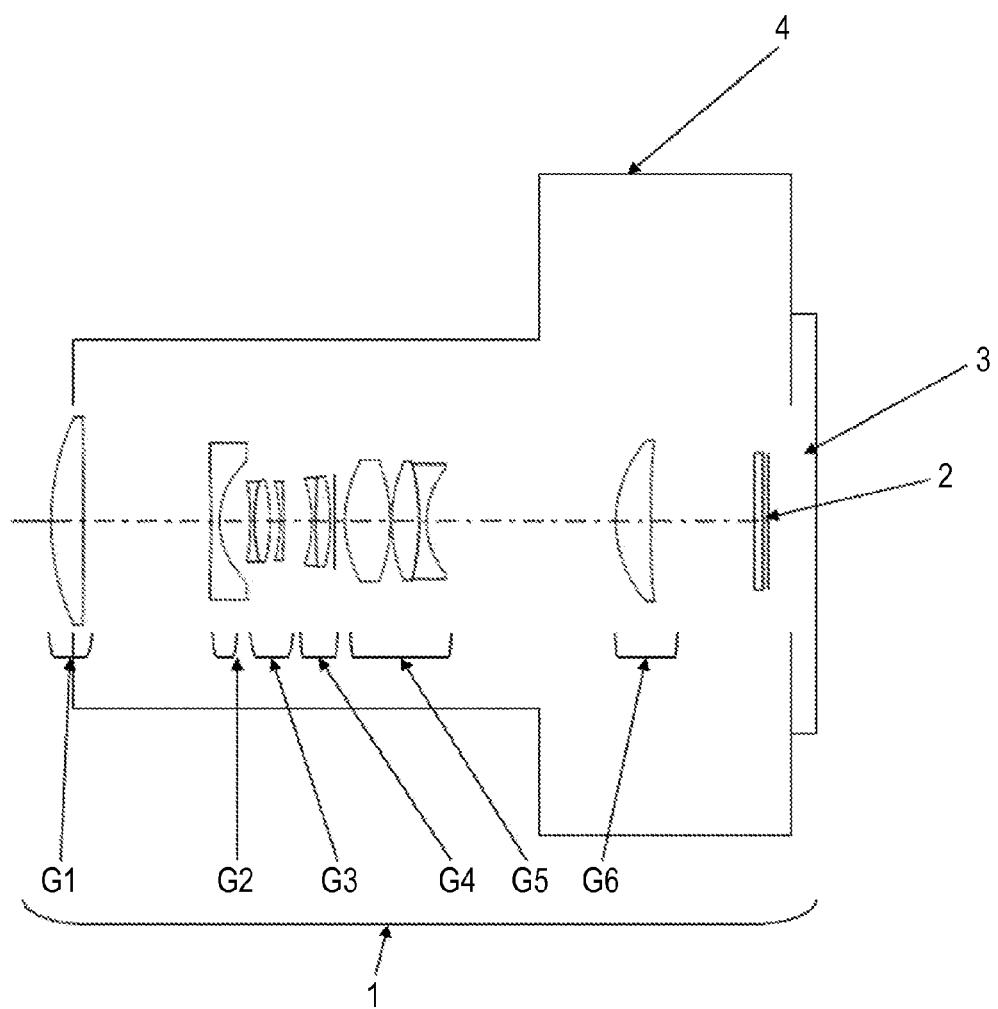
FIG. 16 is a schematic configuration diagram illustrating a camera according to a sixth exemplary embodiment.

FIG. 16 is a schematic configuration diagram illustrating a camera according to a sixth exemplary embodiment. The camera of the sixth exemplary embodiment is a digital camera provided with a imaging device to which the zoom lens system of the first exemplary embodiment is applied. The zoom lens systems of the second to fifth exemplary embodiments can also be applied to the imaging device and the camera.

As illustrated in FIG. 16, the digital camera includes an imaging device liquid crystal monitor 3, and casing 4. The imaging device includes zoom lens system 1 and imaging element 2.

Similarly to the first exemplary embodiment, an actuator and a lens frame are constructed in zoom lens system 1 such that all the lens groups of first lens group G1 to sixth lens group G6 move along the optical axis in the zooming.

By way of example, the zoom lens system of the first exemplary embodiment is applied to the digital camera. The zoom lens system of the first exemplary embodiment can also be applied to a smartphone, an interchangeable lens camera, and the like.

EXAMPLES

Examples in which the zoom lens systems of the first to fifth exemplary embodiments are specifically implemented will be described below. In each example, a length in Table is expressed in terms of "mm" and an angle of view is expressed in terms of "°". In each example, r is a curvature radius, d is a surface interval, nd is a refractive index for a d-line, vd is an Abbe number for the d-line. In each example, a surface to which a mark "*" is added is an aspherical surface, and an aspherical shape is defined by the following equation.

$$Z = \frac{h^2/r}{1 + \sqrt{1-(1+\kappa)(h/r)^2}} + \sum A_n h^n$$

where

Z represents a distance to a tangent at an aspherical peak from a point on the aspherical surface having a height h from the optical axis, h represents a height from the optical axis, r represents a peak curvature radius, κ represents a conic constant, and An represents an nth-order aspherical coefficient.

FIGS. 2, 5, 8, 11, and 14 are longitudinal aberration diagrams in the infinity object focusing states of the zoom lens systems of Examples 1 to 5.

In each of the longitudinal aberration diagrams in FIGS. 2, 5, 8, 11, and 14, a part (a) illustrates each aberration at the wide angle end, a part (b) illustrates each aberration at the intermediate position, and a part (c) illustrates each aberration at the telephoto end. Each of the longitudinal aberration diagrams in FIGS. 2, 5, 8, 11, and 14 illustrates a spherical aberration (SA (mm)), an astigmatism (AST (mm)), and a distortion (DIS (%)) in order from the left. In each spherical aberration diagram, a vertical axis indicates an F number (indicated by the symbol F in the drawing), a solid line indicates a characteristic of the d-line, a short broken line indicates a characteristic of an F-line, and a long broken line indicates a characteristic of a C-line. In each astigmatism diagram, a vertical axis indicates a height (indicated by the symbol H in the drawing), a solid line indicates a characteristic of a sagittal plane (indicated by the symbol s in the drawing), and a broken line indicates a characteristic of a meridional plane (indicated by the symbol m in the drawing). In each distortion diagram, a vertical axis indicates the height (indicated by the symbol H in the drawing).

FIGS. 3, 6, 9, 12, and 15 are transverse aberration diagrams in the basic state in which the image blurring correction is not performed and the image blurring correction state at the telephoto end of each of the zoom lens systems of the first to fifth exemplary embodiments.

In the transverse aberration diagrams of FIGS. 3, 6, 9, 12, and 15, three aberration diagrams at the upper stage correspond to the basic state in which the image blurring correction is not performed at the telephoto end, and three aberration diagrams at the lower stage correspond to the image blurring correction state in which the image blurring correction lens element or the image blurring correction lens group (third lens element L3 and fourth lens element L4 in third lens group G3 of Examples 1, 4, and 5, and whole third lens group G3 in Example 2) is moved by a predetermined amount in the direction perpendicular to the optical axis, at the telephoto end. In each transverse aberration diagram in the basic state, the upper stage corresponds to the transverse aberration at the image point of 70% of the maximum height, the intermediate stage corresponds to the transverse aberration at the on-axis image point, and the lower stage corresponds to the transverse aberration at the image point of −70% of the maximum height. In each transverse aberration diagram in the image blurring correction state, the upper stage corresponds to the transverse aberration at the image point of 70% of the maximum height, the intermediate stage corresponds to the transverse aberration at the on-axis image point, and the lower stage corresponds to the transverse aberration at the image point of −70% of the maximum height. In each transverse aberration diagram, a horizontal axis indicates a distance from a principal ray on a pupil plane, a solid line indicates the characteristic of the d-line, a short broken line indicates the characteristic of the F-line, and a long broken line indicates the characteristic of the C-line. In each transverse aberration diagram, it is assumed that the meridional plane includes the optical axis of first lens group G1 and the optical axis of third lens group G3 (Examples 1 to 5).

In the zoom lens system of each example, the movement amount of the image blurring correction lens group in the direction perpendicular to the optical axis at the telephoto end in the image blurring correction state is as follows.

In Example 1, the movement amount is 0.300 mm,
In Example 2, the movement amount is 0.277 mm,
In Example 4, the movement amount is 0.078 mm, and
In Example 5, the movement amount is 0.285 mm.

In the case that the zoom lens system tilts by a predetermined angle at the telephoto end of an infinite photographing distance, an image eccentric amount is equal to an image eccentric amount in which the image blurring correction lens group translates by the above value in the direction perpendicular to the optical axis.

As is clear from each transverse aberration diagram, the transverse aberration has good symmetry at the on-axis image point. When the transverse aberration at the image point of +70% and the transverse aberration at the image point of −70% are compared to each other in the basic state, both of the transverse aberrations have the small curvature, and slopes of aberration curves are substantially equal to each other. Therefore, it is found that an eccentric comatic aberration and an eccentric astigmatism are small. This means that imaging performance is sufficiently obtained even in the image blurring correction state. For the identical image blurring correction angle of the zoom lens system, a translation amount necessary for the image blurring correction decreases with decreasing focal distance of the whole zoom lens system. Accordingly, at any zoom position, the image blurring correction can sufficiently be performed without degrading the imaging performance with respect to the image blurring correction angle up to a predetermined angle.

Example 1

The zoom lens system of Example 1 corresponds to the first exemplary embodiment in FIG. 1. Table 1 illustrates surface data of the zoom lens system of Example 1, Table 2 illustrates aspherical data, and Table 3 illustrates various pieces of data in the infinity object focusing state.

TABLE 1

(surface data)

| Surface number | r | d | nd | vd |
|---|---|---|---|---|
| Object surface | ∞ | | | |
| 1 | 40.72140 | 4.22490 | 1.59282 | 68.6 |
| 2 | −1385.65440 | Variable | | |
| 3* | −112.92660 | 1.10000 | 1.80500 | 41.0 |
| 4* | 13.11950 | Variable | | |
| 5 | −42.55130 | 0.50000 | 1.80518 | 25.5 |
| 6 | 27.44620 | 0.01000 | 1.56732 | 42.8 |
| 7 | 27.44620 | 2.07640 | 1.91082 | 35.3 |
| 8 | −27.44620 | 1.30100 | | |
| 9 | −25.46030 | 0.50000 | 1.68826 | 31.1 |
| 10* | −69.42220 | Variable | | |
| 11* | −19.59550 | 0.50000 | 1.58332 | 59.3 |
| 12 | 121.91540 | 0.01000 | 1.56732 | 42.8 |
| 13 | 121.91540 | 1.92210 | 2.00272 | 19.3 |
| 14 | −29.91340 | 0.51000 | | |
| 15 (Diaphragm) | ∞ | Variable | | |
| 16* | 18.80360 | 6.00000 | 1.55343 | 71.5 |
| 17* | −24.35930 | 0.15000 | | |
| 18 | 24.72920 | 3.58660 | 1.77250 | 49.6 |
| 19 | −41.58090 | 0.01000 | 1.56732 | 42.8 |
| 20 | −41.58090 | 0.97960 | 1.84666 | 23.8 |
| 21 | 13.91520 | Variable | | |
| 22* | 19.63900 | 4.62950 | 1.55343 | 71.5 |
| 23* | 9746.50980 | Variable | | |
| 24 | ∞ | 1.10000 | 1.51680 | 64.2 |
| 25 | ∞ | BF | | |
| Image surface | ∞ | | | |

TABLE 2

(aspherical data)

Surface No. 3

$K = 0.00000E+00$, $A4 = 4.04330E-05$, $A6 = -5.92449E-08$, $A8 = -1.80291E-09$ $A10 = 1.41335E-11$, $A12 = -3.27100E-14$

Surface No. 4

$K = 0.00000E+00$, $A4 = 5.69066E-07$, $A6 = 8.11958E-07$, $A8 = -1.24411E-08$ $A10 = 5.48832E-11$, $A12 = 0.00000E+00$

Surface No. 10

$K = 0.00000E+00$ $A4 = 8.18947E-05$, $A6 = 4.95376E-07$, $A8 = -3.42721E-09$ $A10 = 1.05655E-10$, $A12 = 0.00000E+00$

Surface No. 11

$K = 0.00000E+00$ $A4 = 7.43261E-05$, $A6 = 3.73289E-07$, $A8 = -5.11294E-09$ $A10 = 1.31843E-10$, $A12 = 0.00000E+00$

TABLE 2-continued (aspherical data)

Surface No. 16

$K = 0.00000E+00$, $A4 = -3.76482E-05$, $A6 = 1.07311E-07$, $A8 = -1.38939E-09$ $A10 = 1.81605E-11$, $A12 = 0.00000E+00$

Surface No. 17

$K = 0.00000E+00$, $A4 = 2.30876E-05$, $A6 = 9.80261E-09$, $A8 = -7.67882E-10$ $A10 = 1.93662E-11$, $A12 = 0.00000E+00$

Surface No. 22

$K = 0.00000E+00$, $A4 = -4.64106E-06$, $A6 = 1.86129E-07$, $A8 = -1.86394E-09$ $A10 = 6.69528E-12$, $A12 = 0.00000E+00$

Surface No. 23

$K = 0.00000E+00$, $A4 = 1.67447E-05$, $A6 = 2.00177E-07$, $A8 = -2.19294E-09$ $A10 = 7.81576E-12$, $A12 = 0.00000E+00$

TABLE 3

(various pieces of data in infinity object focusing state)
Zooming ratio 2.88874

| | Wide-angle limit | Middle position | Telephoto limit |
|---|---|---|---|
| Focal length | 11.2612 | 19.1449 | 32.5307 |
| F-number | 1.76551 | 2.51390 | 2.91140 |
| View angle | 41.3938 | 27.1226 | 16.5193 |
| Image height | 8.5290 | 9.4390 | 9.8080 |
| Overall length of lens system | 75.3118 | 81.0817 | 93.9812 |
| BF | 0.82178 | 0.82978 | 0.79743 |
| d2 | 0.7165 | 7.7275 | 16.6911 |
| d4 | 13.7558 | 6.9790 | 4.0594 |
| d10 | 1.6811 | 2.9900 | 3.6811 |
| d15 | 11.4515 | 6.1943 | 1.3700 |
| d21 | 5.0978 | 13.6054 | 24.7534 |
| d23 | 12.6772 | 13.6458 | 13.5187 |
| Entrance pupil position | 15.1332 | 25.0216 | 44.0940 |
| Exit pupil position | −81.6753 | −94.8085 | −257.8680 |
| Front principal points position | 24.8572 | 40.3341 | 72.5336 |
| Back principal points position | 64.0506 | 61.9367 | 61.4505 |

Single lens data

| Lens element | Initial surface number | Focal length |
|---|---|---|
| 1 | 1 | 66.8036 |
| 2 | 3 | −14.5446 |
| 3 | 5 | −20.6556 |
| 4 | 7 | 15.3434 |
| 5 | 9 | −58.6883 |
| 6 | 11 | −28.9037 |
| 7 | 13 | 24.1075 |
| 8 | 16 | 20.1740 |
| 9 | 18 | 20.5582 |
| 10 | 20 | −12.2154 |
| 11 | 22 | 35.5516 |

Zoom lens unit data

| Lens unit | Initial surface No. | Focal length | Overall length of lens unit | Front principal points position | Back principal points position |
|---|---|---|---|---|---|
| 1 | 1 | 66.80360 | 4.22490 | 0.07581 | 1.64532 |
| 2 | 3 | −14.54458 | 1.10000 | 0.54387 | 1.03681 |
| 3 | 5 | 552.66698 | 4.38740 | 2.71415 | 4.18812 |
| 4 | 11 | 119.14311 | 2.94210 | 5.24758 | 6.58158 |

TABLE 3-continued (various pieces of data in infinity object focusing state)
Zooming ratio 2.88874

| 5 | 16 | 29.22176 | 10.72620 | −4.78124 | 1.44359 |
| 6 | 22 | 35.55159 | 4.62950 | −0.00602 | 1.64381 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 3 | −0.30039 | −0.35125 | −0.44829 |
| 3 | 5 | 1.06853 | 1.05621 | 1.05317 |
| 4 | 11 | 1.60702 | 1.49595 | 1.47765 |
| 5 | 16 | −0.63345 | −1.05718 | −1.41604 |
| 6 | 22 | 0.51592 | 0.48845 | 0.49293 |

Example 2

The zoom lens system of Example 2 corresponds to the second exemplary embodiment in FIG. 4. Table 4 illustrates surface data of the zoom lens system of Example 2, Table 5 illustrates aspherical data, and Table 6 illustrates various pieces of data in the infinity object focusing state.

TABLE 4

(surface data)

| Surface number | r | d | nd | vd |
|---|---|---|---|---|
| Object surface | ∞ | | | |
| 1 | 53.51710 | 3.32930 | 1.58113 | 53.2 |
| 2 | −131.95350 | Variable | | |
| 3* | −77.42990 | 1.15000 | 1.85000 | 47.0 |
| 4* | 18.39310 | Variable | | |
| 5 | −25.97420 | 0.90000 | 1.63834 | 22.2 |
| 6 | 51.07350 | 0.01000 | 1.56732 | 42.8 |
| 7 | 51.07350 | 1.89940 | 1.86718 | 40.0 |
| 8 | −23.16030 | Variable | | |
| 9* | −22.16000 | 0.50000 | 1.91182 | 29.2 |
| 10* | −55.25760 | 0.30000 | | |
| 11(Diaphragm) | ∞ | 1.22940 | | |
| 12* | −18.32140 | 0.60000 | 1.57358 | 62.6 |
| 13 | 34.52980 | 0.01000 | 1.56732 | 42.8 |
| 14 | 34.52980 | 2.44590 | 1.98911 | 20.6 |
| 15 | −32.62100 | Variable | | |
| 16 | 18.40550 | 4.63120 | 1.49700 | 81.6 |
| 17 | −31.73900 | 0.15000 | | |
| 18* | 46.48700 | 3.21570 | 1.84355 | 47.2 |
| 19 | −20.26020 | 0.01000 | 1.56732 | 42.8 |
| 20 | −20.26020 | 0.70000 | 1.64912 | 23.7 |
| 21 | 15.19920 | Variable | | |
| 22* | 19.10750 | 5.57700 | 1.51845 | 70.0 |
| 23* | 177.48800 | Variable | | |
| 24 | ∞ | 0.90000 | 1.51680 | 64.2 |
| 25 | ∞ | BF | | |
| Image surface | ∞ | | | |

TABLE 5

(aspherical data)

Surface No. 3

K = 0.00000E+00, A4 = 2.34852E−05, A6 = −1.96636E−07,
A8 = 1.26189E−09 A10 = −4.79910E−12, A12 = 6.98368E−15

Surface No. 4

K = 0.00000E+00, A4 = −5.56107E−06, A6 = −3.00787E−07,
A8 = 1.78115E−09 A10 = −9.38296E−12, A12 = 0.00000E+00

TABLE 5-continued (aspherical data)

Surface No. 9

K = 0.00000E+00, A4 = −1.43560E−04, A6 = −7.80680E−07,
A8 = 2.81134E−08 A10 = −3.91234E−10, A12 = 0.00000E+00

Sarface No. 10

K = 0.00000E+00, A4 = 6.81570E−06, A6 = 4.98074E−07,
A8 = 1.88771E−08 A10 = −3.13905E−10, A12 = 0.00000E+00

Surface No. 12

K = 0.00000E+00, A4 = 1.66392E−04, A6 = 9.58578E−07,
A8 = −2.25833E−09 A10 = −8.77538E−11, A12 = 0.00000E+00

Surface No. 18

K = 0.00000E+00, A4 = −4.87380E−05, A6 = −3.84157E−08,
A8 = −1.27037E−09 A10 = 4.71921E−12, A12 = 0.00000E+00

Surface No. 22

K = 0.00000E+00, A4 = −4.12307E−06, A6 = −5.41018E−08,
A8 = 2.56419E−10 A10 = 5.40421E−13, A12 = 0.00000E+00

Surface No. 23

K = 0.00000E+00, A4 = 1.59102E−05, A6 = −1.60060E−07,
A8 = 1.20900E−09 A10 = −1.79066E−12, A12 = 0.00000E+00

TABLE 6

(various pieces of data in infinity object focusing state)
Zooming ratio 2.92323

| | Wide-angle limit | Middle position | Telephoto limit |
|---|---|---|---|
| Focal length | 11.4494 | 19.5986 | 33.5264 |
| F-number | 1.87204 | 2.33535 | 2.91208 |
| View angle | 41.5279 | 27.3482 | 16.7079 |
| Image height | 8.7500 | 9.6600 | 10.0870 |
| Overall length of lens system | 74.0996 | 79.4009 | 90.0033 |
| BF | 1.30682 | 1.30604 | 1.31145 |
| d2 | 0.5000 | 5.2775 | 12.0455 |
| d4 | 15.9574 | 8.3408 | 4.0000 |
| d8 | 0.8715 | 1.8469 | 1.6518 |
| d15 | 10.3000 | 5.4204 | 0.8000 |
| d21 | 4.0149 | 16.7770 | 30.0825 |
| d23 | 13.5911 | 12.8744 | 12.5542 |
| Entrance pupil position | 14.6547 | 19.1924 | 28.1547 |
| Exit pupil position | −109.4356 | −150.9068 | −655.5274 |
| Front principal points position | 24.9203 | 36.2675 | 59.9699 |
| Back principal points position | 62.6503 | 59.8023 | 56.4770 |

Single lens data

| Lens element | Initial surface number | Focal length |
|---|---|---|
| 1 | 1 | 65.9543 |
| 2 | 3 | −17.3895 |
| 3 | 5 | −26.8506 |
| 4 | 7 | 18.5961 |
| 5 | 9 | −40.8691 |
| 6 | 12 | −20.7830 |
| 7 | 14 | 17.2717 |
| 8 | 16 | 24.1818 |
| 9 | 18 | 17.1046 |
| 10 | 20 | −13.2753 |
| 11 | 22 | 40.8107 |

TABLE 6-continued (various pieces of data in infinity object focusing state)
Zooming ratio 2.92323

Zoom lens unit data

| Lens unit | Initial surface No. | Focal length | Overall length of lens unit | Front principal points position | Back principal points position |
|---|---|---|---|---|---|
| 1 | 1 | 65.95426 | 3.32930 | 0.61162 | 1.82128 |
| 2 | 3 | −17.38949 | 1.15000 | 0.49955 | 1.03133 |
| 3 | 5 | 53.52393 | 2.80940 | 3.28100 | 4.63167 |
| 4 | 9 | −97.16646 | 5.08530 | −7.72663 | −7.05968 |
| 5 | 16 | 30.97536 | 8.70690 | −2.08019 | 1.92374 |
| 6 | 22 | 40.81069 | 5.57709 | −0.43784 | 1.50997 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 3 | −0.37756 | −0.42126 | −0.50387 |
| 3 | 5 | 5.24140 | 3.13583 | 2.67985 |
| 4 | 9 | 0.30797 | 0.47681 | 0.54228 |
| 5 | 16 | −0.54696 | −0.87635 | −1.27133 |
| 6 | 22 | 0.52076 | 0.53834 | 0.54605 |

Example 3

The zoom lens system of Example 3 corresponds to the third exemplary embodiment in FIG. 7. Table 7 illustrates surface data of the zoom lens system of Example 3, Table 8 illustrates aspherical data, and Table 9 illustrates various pieces of data in the infinity object focusing state.

TABLE 7

(surface data)

| Surface number | r | d | nd | vd |
|---|---|---|---|---|
| Object surface | ∞ | | | |
| 1 | 30.76470 | 4.31820 | 1.48016 | 59.6 |
| 2 | −282.85600 | Variable | | |
| 3* | −98.32270 | 1.15000 | 1.85000 | 47.0 |
| 4* | 15.10180 | Variable | | |
| 5 | −87.70080 | 0.90000 | 1.90723 | 20.9 |
| 6 | 39.50400 | 0.01000 | 1.56732 | 42.8 |
| 7 | 39.50400 | 1.24070 | 1.85000 | 47.0 |
| 8 | −65.93000 | 1.24890 | | |
| 9* | −25.44350 | 0.50000 | 1.87700 | 26.8 |
| 10* | −44.05200 | 1.36650 | | |
| 11(Diaphragm) | ∞ | 1.04340 | | |
| 12* | −15.48050 | 0.60000 | 1.43000 | 95.0 |
| 13 | 43.52660 | 0.01000 | 1.59732 | 42.8 |
| 14 | 43.52660 | 2.33990 | 1.98879 | 20.6 |
| 15 | −28.16640 | Variable | | |
| 16 | 18.20530 | 3.87200 | 1.49700 | 81.6 |
| 17 | −32.07840 | 0.15000 | | |
| 18* | 50.10210 | 3.03480 | 1.85000 | 47.0 |
| 19 | −18.79380 | 0.01000 | 1.56732 | 42.8 |
| 20 | −18.79380 | 0.70000 | 1.65080 | 22.9 |
| 21 | 14.27530 | Variable | | |
| 22* | 19.48590 | 5.91560 | 1.51845 | 70.0 |
| 23* | 273.97900 | Variable | | |
| 24 | ∞ | 0.90000 | 1.51680 | 64.2 |
| 25 | ∞ | BF | | |
| Image surface | ∞ | | | |

TABLE 8

(aspherical data)

Surface No. 3

K = 0.00000E+00, A4 = 2.66603E−05, A6 = −1.65542E−07,
A8 = 1.10050E−09 A10 = −4.98313E−12, A12 = 8.99032E−15

Surface No. 4

K = 0.00000E+00, A4 = −1.36753E−05, A6 = −3.04909E−07,
A8 = 2.27029E−09 A10 = −1.78104E−11, A12 = 0.00000E+00

Surface No. 9

K = 0.00000E+00, A4 = −1.28910E−04, A6 = −7.98357E−07,
A8 = 2.61864E−08 A10 = −7.66611E−10, A12 = 0.00000E+00

Surface No. 10

K = 0.00000E+00, A4 = 1.67441E−05, A6 = 9.35569E−07,
A8 = 1.00703E−08 A10 = −4.30087E−10, A12 = 0.00000E+00

Surface No. 12

K = 0.00000E+00, A4 = 1.65780E−04, A6 = 1.37167E−06,
A8 = 1.70598E−09 A10 = −1.58908E−10, A12 = 0.00000E+00

Surface No. 18

K = 0.00000E+00, A4 = −5.25692E−05, A6 = −2.58344E−08,
A8 = −1.60196E−09 A10 = 7.45356E−12, A12 = 0.00000E+00

Surface No. 22

K = 0.00000E+00, A4 = 1.37651E−06, A6 = −6.68856E−08,
A8 = 6.66600E−10 A10 = −6.25777E−13, A12 = 0.00000E+00

Surface No. 23

K = 0.00000E+00, A4 = 2.65331E−05, A6 = −2.03694E−07,
A8 = 1.99956E−09 A10 = −4.46837E−12, A12 = 0.00000E+00

TABLE 9

(various pieces of data in infinity object focusing state)
Zooming ratio 2.92834

| | Wide-angle limit | Middle position | Telephoto limit |
|---|---|---|---|
| Focal length | 11.4500 | 19.5998 | 33.5295 |
| F-number | 1.87208 | 2.33515 | 2.91235 |
| View angle | 40.8312 | 26.8044 | 16.6943 |
| Image height | 8.7000 | 9.4500 | 10.0870 |
| Overall length of lens system | 70.9986 | 77.7673 | 89.1997 |
| BF | 1.30856 | 1.30851 | 1.29781 |
| d2 | 0.5000 | 6.7751 | 13.1973 |
| d4 | 13.8774 | 7.8119 | 4.1906 |
| d15 | 9.4502 | 4.9582 | 0.8817 |
| d21 | 2.0000 | 13.7003 | 28.1560 |
| d23 | 14.5524 | 13.9033 | 12.1663 |
| Entrance pupil position | 15.3021 | 23.5771 | 34.9646 |
| Exit pupil position | −68.3284 | −94.9753 | −345.1986 |
| Front principal points position | 24.8694 | 39.1871 | 65.2495 |
| Back principal points position | 59.5486 | 58.1675 | 55.6702 |

Single lens data

| Lens element | Initial surface number | Focal length |
|---|---|---|
| 1 | 1 | 58.0453 |
| 2 | 3 | −15.3299 |
| 3 | 5 | −29.9203 |
| 4 | 7 | 29.2199 |
| 5 | 9 | −69.5534 |
| 6 | 12 | −26.4753 |
| 7 | 14 | 17.5797 |
| 8 | 16 | 23.9815 |

TABLE 9-continued (various pieces of data in infinity object focusing state)
Zooming ratio 2.92834

| 9 | 18 | 16.4111 |
|---|---|---|
| 10 | 20 | −12.3629 |
| 11 | 22 | 40.1441 |

Zoom lens unit data

| Lens unit | Initial surface No. | Focal length | Overall lenght of lens unit | Front principal points position | Back principal points position |
|---|---|---|---|---|---|
| 1 | 1 | 58.04530 | 4.31820 | 0.28746 | 1.67520 |
| 2 | 3 | −15.32986 | 1.15000 | 0.53636 | 1.06762 |
| 3 | 5 | 100.11260 | 9.25940 | 15.68245 | 19.69727 |
| 4 | 16 | 33.72328 | 7.76680 | −2.65231 | 1.04048 |
| 5 | 22 | 40.14410 | 5.91560 | −0.29594 | 1.75452 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 3 | −0.39271 | −0.46793 | −0.58203 |
| 3 | 5 | 2.03811 | 1.85282 | 1.79077 |
| 4 | 16 | −0.50662 | −0.77485 | −1.01473 |
| 5 | 22 | 0.48641 | 0.50264 | 0.54617 |

Example 4

The zoom lens system of Example 4 corresponds to the fourth exemplary embodiment in FIG. 10. Table 10 illustrates surface data of the zoom lens system of Example 4, Table 11 illustrates aspherical data, and Table 12 illustrates various pieces of data in the infinity object focusing state.

TABLE 10

(surface data)

| Surface number | r | d | nd | vd |
|---|---|---|---|---|
| Object surface | ∞ | | | |
| 1 | 115.77660 | 3.10510 | 1.48708 | 70.4 |
| 2 | −76.11770 | Variable | | |
| 3* | −66.86650 | 1.15000 | 1.71621 | 55.1 |
| 4* | 16.42850 | Variable | | |
| 5* | −11.89430 | 0.90000 | 1.69692 | 32.2 |
| 6 | 17.69990 | 0.01000 | 1.56732 | 42.8 |
| 7 | 17.69990 | 1.76230 | 1.84503 | 43.1 |
| 8 | 51.13040 | 0.01000 | | |
| 9 | 41.68730 | 1.62960 | 1.99871 | 25.4 |
| 10* | −81.99720 | 0.37930 | | |
| 11(Diaphragm) | ∞ | 0.30000 | | |
| 12 | 73.87620 | 1.93970 | 1.84670 | 23.8 |
| 13 | −42.93060 | Variable | | |
| 14 | 19.10680 | 3.82510 | 1.49700 | 81.6 |
| 15 | −32.98740 | 0.20000 | | |
| 16* | 37.73620 | 2.93310 | 1.72920 | 54.7 |
| 17 | −21.28880 | 0.01000 | 1.56732 | 42.8 |
| 18 | −21.28880 | 0.35000 | 1.66637 | 31.4 |
| 19 | −250.96790 | Variable | | |
| 20 | 278.71130 | 0.35000 | 1.80903 | 25.8 |
| 21 | 15.05630 | Variable | | |
| 22* | 21.10760 | 7.00000 | 1.51845 | 70.0 |
| 23* | −79.42830 | Variable | | |
| 24 | ∞ | 0.40000 | 1.51680 | 64.2 |
| 25 | ∞ | BF | | |
| Image surface | ∞ | | | |

TABLE 11

(aspherical data)

Surface No. 3

K = 0.00000E+00, A4 = 1.06332E−05, A6 = −7.56712E−08,
A8 = 4.96782E−10 A10 = −2.45315E−12, A12 = 3.64417E−15

Surface No. 4

K = 0.00000E+00, A4 = −3.06297E−05, A6 = −2.72106E−07,
A8 = 1.39527E−09 A10 = −1.27916E−11, A12 = 0.00000E+00

Surface No. 5

K = 0.00000E+00, A4 = −1.21120E−05, A6 = 1.92951E−07,
A8 = 4.52482E−09 A10 = −7.79497E−11, A12 = 0.00000E+00

Surface No. 10

K = 0.00000E+00, A4 = 3.41110E−05, A6 = 2.25464E−07,
A8 = −5.90529E−10 A10 = −2.18961E−12, A12 = 0.00000E+00

Surface No. 16

K = 0.00000E+00, A4 = −4.28970E−05, A6 = −7.83963E−08,
A8 = −4.77595E−10 A10 = 2.82882E−13, A12 = 0.00000E+00

Surface No. 22

K = 0.00000E+00, A4 = 7.10643E−06, A6 = −1.08788E−07,
A8 = 5.62687E−10 A10 = −3.42233E−13, A12 = 0.00000E+00

Surface No. 23

K = 0.00000E+00, A4 = 3.61473E−05, A6 = −2.57333E−07,
A8 = 1.56356E−09 A10 = −2.66810E−12, A12 = 0.00000E+00

TABLE 12

(various pieces of data in infinity object focusing state)
Zooming ratio 2.92855

| | Wide-angle limit | Middle position | Telephoto limit |
|---|---|---|---|
| Focal length | 11.4502 | 19.6005 | 33.5325 |
| F-number | 1.86315 | 2.50039 | 2.94774 |
| View angle | 41.4658 | 26.8981 | 16.3846 |
| Image height | 8.7000 | 9.3500 | 9.9750 |
| Overall length of lens system | 73.1367 | 76.8906 | 92.0003 |
| BF | 0.50007 | 0.49974 | 0.49784 |
| d2 | 0.5000 | 6.0744 | 14.3152 |
| d4 | 16.8567 | 7.9462 | 4.000 |
| d13 | 10.3000 | 5.7240 | 1.1000 |
| d19 | 1.5000 | 2.4819 | 3.2711 |
| d21 | 2.0000 | 13.0676 | 28.5509 |
| d23 | 15.2257 | 14.8426 | 14.0111 |
| Entrance pupil position | 14.0652 | 17.8200 | 27.3883 |
| Exit pupil position | −65.4633 | −127.2344 | 273.7061 |
| Front principal points position | 23.5278 | 34.4128 | 65.0365 |
| Back principal points position | 61.6865 | 57.2901 | 58.4678 |

Single lens data

| Lens element | Initial surface number | Focal length |
|---|---|---|
| 1 | 1 | 94.8032 |
| 2 | 3 | −18.3086 |
| 3 | 5 | −10.0816 |
| 4 | 7 | 31.2806 |
| 5 | 9 | 27.8558 |
| 6 | 12 | 32.3142 |
| 7 | 14 | 24.9523 |
| 8 | 16 | 19.0644 |
| 9 | 18 | −34.9300 |

TABLE 12-continued (various pieces of data in infinity object focusing state)
Zooming ratio 2.92855

| 10 | 20 | −19.6849 |
| 11 | 22 | 32.9485 |

Zoom lens unit data

| Lens unit | Initial surface No. | Focal length | Overall length of lens unit | Front principal points position | Back principal points position |
|---|---|---|---|---|---|
| 1 | 1 | 94.80321 | 3.10510 | 1.26658 | 2.27239 |
| 2 | 3 | −18.30857 | 1.15000 | 0.53484 | 1.01859 |
| 3 | 5 | 136.87439 | 6.93090 | 21.20710 | 27.39009 |
| 4 | 14 | 15.98317 | 7.31820 | 1.85596 | 4.34707 |
| 5 | 20 | −19.68486 | 0.35000 | 0.20464 | 0.36106 |
| 6 | 22 | 32.94847 | 7.00000 | 0.99144 | 3.26921 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 3 | −0.24533 | −0.26514 | −0.30107 |
| 3 | 5 | 1.80387 | 1.62123 | 1.56045 |
| 4 | 14 | −0.18641 | −0.28456 | −0.36977 |
| 5 | 20 | 3.6466 | 4.09146 | 4.64427 |
| 6 | 22 | 0.40148 | 0.41312 | 0.43841 |

Example 5

The zoom lens system of Example 5 corresponds to the fifth exemplary embodiment in FIG. 13. Table 13 illustrates surface data of the zoom lens system of Example 5, Table 14 illustrates aspherical data, and Table 15 illustrates various pieces of data in the infinity object focusing state.

TABLE 13

(surface data)

| Surface number | r | d | nd | vd |
|---|---|---|---|---|
| Object surface | ∞ | | | |
| 1 | 72.20530 | 3.10630 | 1.59282 | 68.6 |
| 2 | −208.52920 | Variable | | |
| 3* | −45.15760 | 0.86250 | 1.80500 | 41.0 |
| 4* | 16.21220 | Variable | | |
| 5 | −62.32510 | 0.37500 | 1.86908 | 24.3 |
| 6 | 9.48280 | 0.00750 | 1.56732 | 42.8 |
| 7 | 9.48280 | 3.01460 | 1.90366 | 31.3 |
| 8 | −28.11490 | 0.37500 | | |
| 9 | −44.23310 | 0.37500 | 1.68400 | 31.3 |
| 10* | −166.74420 | Variable | | |
| 11* | −12.82500 | 0.37500 | 1.58332 | 59.3 |
| 12 | 35.15730 | 0.00750 | 1.56732 | 42.8 |
| 13 | 35.15730 | 1.92060 | 1.97908 | 18.8 |
| 14 | −35.34520 | 0.38250 | | |
| 15(Diaphragm) | ∞ | Variable | | |
| 16* | 13.19830 | 4.50000 | 1.49700 | 81.6 |
| 17* | −18.73290 | 0.07500 | | |
| 18 | 19.24720 | 3.05350 | 1.76681 | 49.7 |
| 19 | −31.81660 | 0.00750 | 1.56732 | 42.8 |
| 20 | −31.91660 | 0.52500 | 1.80582 | 25.6 |
| 21 | 10.36250 | Variable | | |
| 22* | 17.38720 | 4.93850 | 1.51776 | 69.9 |
| 23* | −317.31530 | Variable | | |
| 24 | ∞ | 0.82500 | 1.51680 | 64.2 |
| 25 | ∞ | BF | | |
| Image surface | ∞ | | | |

TABLE 14

(aspherical data)

Surface No. 3

K = 0.00000E+00, A4 = 6.97623E−05, A6 = −4.55558E−07,
A8 = 2.01750E−09 A10 = −4.45169E−12, A12 = 3.94402E−15

Surface No. 4

K = 0.00000E+00, A4 = 9.83721E−06, A6 = 4.69214E−08,
A8 = −5.16354E−09 A10 = 3.09018E−11, A12 = 0.00000E+00

Surface No. 10

K = 0.00000E+00, A4 = 9.59464E−05, A6 = 5.95879E−07,
A8 = 1.04087E−08 A10 = 1.68609E−10, A12 = 0.00000E+00

Surface No. 11

K = 0.00000E+00, A4 = 6.27571E−05, A6 = 7.50518E−08,
A8 = 9.79854E−09 A10 = 1.77743E−10, A12 = 0.00000E+00

Surface No. 16

K = 0.00000E+00, A4 = −9.03584E−05, A6 = 7.89697E−08,
A8 = −2.33135E−09 A10 = 6.71950E−12, A12 = 0.00000E+00

Surface No. 17

K = 0.00000E+00, A4 = 5.78163E−05, A6 = −1.06010E−07,
A8 = 8.73493E−10 A10 = 1.24235E−12, A12 = 0.00000E+00

Surface No. 22

K = 0.00000E+00, A4 = 8.74961E−07, A6 = −3.05392E−07,
A8 = 2.57988E−09 A10 = −9.91658E−12, A12 = 0.00000E+00

Surface No. 23

K = 0.00000E+00, A4 = 1.97911E−05, A6 = −3.81015E−07,
A8 = 3.46888E−09 A10 = −1.23442E−11, A12 = 0.00000E+00

TABLE 15

(various pieces of data in infinity object focusing state)
Zooming ratio 4.71178

| | Wide-angle limit | Middle position | Telephoto limit |
|---|---|---|---|
| Focal length | 8.4526 | 18.3752 | 39.8267 |
| F-number | 1.76810 | 2.76559 | 2.91241 |
| View angle | 41.9813 | 20.7945 | 10.0609 |
| Image height | 6.5260 | 6.8930 | 7.1820 |
| Overall length of lens system | 70.7209 | 81.4641 | 110.9699 |
| BF | 1.13186 | 1.13118 | 1.12886 |
| d2 | 1.7849 | 15.2579 | 31.4116 |
| d4 | 15.8797 | 6.2766 | 3.0000 |
| d10 | 1.5000 | 3.2076 | 3.5305 |
| d15 | 11.7447 | 5.2232 | 1.0275 |
| d21 | 3.7500 | 13.1667 | 32.8507 |
| d23 | 10.2037 | 12.4749 | 13.2947 |
| Entrance pupil position | 14.7452 | 33.3744 | 70.1125 |
| Exit pupil position | −93.6400 | −87.2191 | 190.9601 |
| Front principal points position | 22.4439 | 47.9279 | 118.2949 |
| Back principal points position | 62.2683 | 63.0889 | 71.1432 |

Single lens data

| Lens element | Initial surface number | Focal length |
|---|---|---|
| 1 | 1 | 90.8468 |
| 2 | 3 | −14.7268 |
| 3 | 5 | −9.4474 |
| 4 | 7 | 8.1576 |
| 5 | 9 | −88.1266 |
| 6 | 11 | −16.0634 |
| 7 | 13 | 18.2479 |

TABLE 15-continued (various pieces of data in infinity object focusing state)
Zooming ratio 4.71178

| 8 | 16 | 16.3442 |
| 9 | 18 | 16.0743 |
| 10 | 20 | −9.6543 |
| 11 | 22 | 31.9981 |

Zoom lens unit data

| Lens unit | Initial surface No. | Focal length | Overall length of lens unit | Front principal points position | Back principal points position |
| --- | --- | --- | --- | --- | --- |
| 1 | 1 | 90.84677 | 3.10630 | 0.50367 | 1.65171 |
| 2 | 3 | −14.72681 | 0.86250 | 0.34942 | 0.73705 |
| 3 | 5 | 90.98737 | 4.14710 | 3.17797 | 4.99697 |
| 4 | 11 | −193.03748 | 2.68560 | −6.99266 | −6.20728 |
| 5 | 16 | 23.81028 | 8.16160 | −3.99986 | 0.72019 |
| 6 | 22 | 31.99814 | 4.93850 | 0.16988 | 1.83812 |

Magnification of zoom lens unit

| Lens unit | Initial surface No. | Wide-angle limit | Middle position | Telephoto limit |
| --- | --- | --- | --- | --- |
| 1 | 1 | 0.00000 | 0.00000 | 0.00000 |
| 2 | 3 | −0.20304 | −0.24936 | −0.34325 |
| 3 | 5 | 1.68223 | 1.44405 | 1.40191 |
| 4 | 11 | 0.77597 | 0.84367 | 0.85682 |
| 5 | 16 | −0.66005 | −1.44455 | −2.44236 |
| 6 | 22 | 0.53185 | 0.46089 | 0.43535 |

(Corresponding Value of Condition)

Table 16 illustrates a corresponding value of each condition in the zoom lens systems of the examples.

TABLE 16

| | Example 1 | Example 2 | Example 3 | Example 4 | Example 5 |
| --- | --- | --- | --- | --- | --- |
| fG1/fG2 | −4.59 | −3.79 | −3.79 | −5.18 | −6.17 |
| D34T/D34W | 2.19 | 1.90 | 0.09 | 0.11 | 2.35 |
| LT/fT | 2.89 | 2.68 | 2.66 | 2.74 | 2.79 |

A value (−4.59) of fG1/fG2 of Example 1 is a value in which focal distance fG1 (66.80360) of first lens group G1 described in a field of zoom lens group data in Table 3 is divided by focal distance fG2 (−14.54458) of second lens group G2 described in the same field. Each of values of fG1/fG2 of Examples 2 to 5 is a value in which focal distance fG1 of first lens group G1 described in each of Tables 6, 9, 12, and 15 is divided by focal distance fG2 of second lens group G2.

A value (2.19) of D34T/D34W of Example 1 is a value in which interval D34T (3.6811) at the telephoto end between third lens group G3 and fourth lens group G4 described in a line of d10 in Table 3 are divided by interval D34W (1.6811) at the wide angle end between third lens group G3 and fourth lens group G4 described in the same line. Each of values of D34T/D34W of Examples 2 to 5 is a value in which interval D34T at the telephoto end between third lens group G3 and fourth lens group G4 described in each of Tables 6, 9, 12, and 15 is divided by interval D34W at the wide angle end between third lens group G3 and fourth lens group G4.

A value (2.89) of LT/fT of Example 1 is a vlue in which lens total length LT (93.9812) at the telephoto end described in a line of the lens total length in Table 3 is divided by focal distance fT (32.5307) of the whole system at the telephoto end described in a line of the focal distance in Table 3. Each of values of LT/fT of Examples 2 to 5 is a value in which lens total length LT at the telephoto end described in each of Tables 6, 9, 12, and 15 is divided by focal distance fT of the whole system at the telephoto end.

As illustrated in Table 16, each of Examples 1, 2, and 5 satisfies the conditional expression (1), the conditional expression (2), and the conditional expression (3). Examples 3 and 4 satisfy the conditional expression (1) and the conditional expression (3).

Other Exemplary Embodiments

The first to sixth exemplary embodiments have been described above as an illustration of the technology disclosed in the present application. However, the technology of the present disclosure is not limited to the first to sixth exemplary embodiments, but can be applied to exemplary embodiments in which modifications, replacements, additions, and omissions are performed as appropriate.

For example, the zoom lens system of the present disclosure can be applied to a digital still camera, an interchange lens digital camera, a digital video camera, a camera of a mobile phone, a camera of a PDA (Personal Digital Assistance), a monitoring camera of a monitoring system, a Web camera, and a car-mounted camera. Particularly the zoom lens system of the present disclosure is suitable for an imaging optical system, such as the digital still camera system, and the digital video camera system, in which the high quality image is required.

What is claimed is:

1. A zoom lens system comprising:
a first lens group having a positive power;
a second lens group that has a negative power and consists of one lens element;
a third lens group that has a positive power and includes at least two lens elements; and
a subsequent lens group that has a positive power as a whole and includes at least two lens groups in order from an object side to an image side,
wherein, in zooming operation, at least the first lens group to the third lens group move along an optical axis, and the following conditional expression (1) is satisfied $$-9.0 < fG1/fG2 < -2.0 \quad (1)$$

where fG1 represents a focal distance of the first lens group, and
fG2 represents a focal distance of the second lens group, and
wherein the subsequent lens group includes a fourth lens group having a positive power and a fifth lens group having a positive power in the order from the object side to the image side.

2. A zoom lens system comprising:
a first lens group having a positive power;
a second lens group that has a negative power and consists of one lens element;
a third lens group that has a positive power and includes at least two lens elements; and
a subsequent lens group that has a positive power as a whole and includes at least two lens groups in order from an object side to an image side,
wherein, in zooming operation, at least the first lens group to the third lens group move along an optical axis, and the following conditional expression (1) is satisfied $$-9.0 < fG1/fG2 < -2.0 \quad (1)$$

where fG1 represents a focal distance of the first lens group, and
fG2 represents a focal distance of the second lens group, ad wherein the subsequent lens group includes a fourth lens group having a positive power, a fifth lens group having a positive power, and a sixth lens group having a positive power in the order from the object side to the image side.

3. A zoom lens system comprising:
a first lens group having a positive power;
a second lens group that has a negative power and consists of one lens element;
a third lens group that has a positive power and includes at least two lens elements; and
a subsequent lens group that has a positive power as a whole and includes at least two lens groups in order from an object side to an image side,
wherein, in zooming operation, at least the first lens group to the third lens group move along an optical axis, and the following conditional expression (1) is satisfied $$-9.0 < fG1/fG2 < -2.0 \tag{1}$$

where
fG1 represents a focal distance of the first lens group, and
fG2 represents a focal distance of the second lens group, and
wherein the subsequent lens group includes a fourth lens group having a positive power, a fifth lens group having a negative power, and a sixth lens group having a positive power in the order from the object side to the image side.

4. A zoom lens system comprising:
a first lens group having a positive power;
a second lens group that has a negative power and consists of one lens element;
a third lens group that has a positive power and includes at least two lens elements; and
a subsequent lens group that has a positive power as a whole and includes at least two lens groups in order from an object side to an image side,
wherein, in zooming operation, at least the first lens group to the third lens group move along an optical axis, and the following conditional expression (1) is satisfied $$-9.0 < fG1/fG2 < -2.0 \tag{1}$$

where
fG1 represents a focal distance of the first lens group, and
fG2 represents a focal distance of the second lens group, and
wherein the subsequent lens group includes a fourth lens group having a negative power, a fifth lens group having a positive power, and a sixth lens group having a positive power in the order from the object side to the image side.

5. The zoom lens system according to claim 2, wherein the following conditional expression (2) is satisfied $$1.0 < D34T/D34W < 3.0 \tag{2}$$

where
D34W represents the interval at a wide angle end between the third lens group and the fourth lens group, and
D34T represents the interval at a telephoto end between the third lens group and the fourth lens group.

6. The zoom lens system according to claim 1, wherein the following conditional expression (3) is satisfied $$2.0 < LT/fT < 3.5 \tag{3}$$

where
LT represents a lens total length at a telephoto end, and
fT represents a focal distance of a whole system at the telephoto end.

7. The zoom lens system according to claim 2, wherein a part or whole of the third lens group moves in a direction perpendicular to the optical axis in camera shake correction.

8. The zoom lens system according to claim 4, wherein the following conditional expression (2) is satisfied $$1.0 < D34T/D34W < 3.0 \tag{2}$$

where
D34W represents the interval at a wide angle end between the third lens group and the fourth lens group, and
D34T represents the interval at a telephoto end between the third lens group and the fourth lens group.

9. The zoom lens system according to claim 2, wherein the following conditional expression (3) is satisfied $$2.0 < LT/fT < 3.5 \tag{3}$$

where
LT represents a lens total length at a telephoto end, and
fT represents a focal distance of a whole system at the telephoto end.

10. The zoom lens system according to claim 3, wherein the following conditional expression (3) is satisfied $$2.0 < LT/fT < 3.5 \tag{3}$$

where
LT represents a lens total length at a telephoto end, and
fT represents a focal distance of a whole system at the telephoto end.

11. The zoom lens system according to claim 4, wherein the following conditional expression (3) is satisfied $$2.0 < LT/fT < 3.5 \tag{3}$$

where
LT represents a lens total length at a telephoto end, and
fT represents a focal distance of a whole system at the telephoto end.

* * * * *